(12) United States Patent
Warren

(10) Patent No.: US 9,906,952 B2
(45) Date of Patent: Feb. 27, 2018

(54) ANTI-TAKEOVER SYSTEMS AND METHODS FOR NETWORK ATTACHED PERIPHERALS

(71) Applicant: Vivint, Inc., Provo, UT (US)

(72) Inventor: Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 70 days.

(21) Appl. No.: 14/670,134

(22) Filed: Mar. 26, 2015

(65) Prior Publication Data

US 2015/0281954 A1 Oct. 1, 2015

Related U.S. Application Data

(60) Provisional application No. 61/972,128, filed on Mar. 28, 2014.

(51) Int. Cl.
| | |
|---|---|
| *H04L 29/06* | (2006.01) |
| *H04L 9/08* | (2006.01) |
| *H04W 12/04* | (2009.01) |
| *G06F 21/74* | (2013.01) |
| *H04W 12/02* | (2009.01) |
| *G06F 21/60* | (2013.01) |

(52) U.S. Cl.
CPC ......... *H04W 12/04* (2013.01); *G06F 21/602* (2013.01); *G06F 21/74* (2013.01); *H04L 9/0861* (2013.01); *H04W 12/02* (2013.01); *H04L 2209/805* (2013.01)

(58) Field of Classification Search
None
See application file for complete search history.

(56) References Cited

U.S. PATENT DOCUMENTS

| | | | |
|---|---|---|---|
| 7,089,424 B1 | 8/2006 | Subbiah | |
| 8,170,212 B2 * | 5/2012 | Pering | H04L 9/0827 380/255 |
| 8,774,410 B1 * | 7/2014 | Juels | H04L 9/085 380/270 |

(Continued)

OTHER PUBLICATIONS

Anderson, Ross, Haowen Chan, and Adrian Perrig. "Key infection: Smart trust for smart dust." Network Protocols, 2004. ICNP 2004. Proceedings of the 12th IEEE International Conference on. IEEE, 2004.*

(Continued)

*Primary Examiner* — Michael Simitoski
(74) *Attorney, Agent, or Firm* — Holland & Hart LLP

(57) ABSTRACT

Methods, systems, and devices are described for the prevention of network peripheral takeover activity. In some embodiments, peripheral devices may implement an anti-takeover mechanism encrypting messages and transmitting unencrypted decryption keys for a limited period of time. Anti-takeover peripheral devices may transition from a plain operational mode, to a decryption key transmission mode, to a secure mode based on pre-defined triggering events, commands, or timers. Random decryption key values may be generated by peripheral devices and transmitted to listening devices for later storage and retrieval by the listening device. Decryption keys may be stored in remote data stores for later retrieval by anti-takeover aware controller devices.

15 Claims, 18 Drawing Sheets

(56) References Cited

U.S. PATENT DOCUMENTS

| | | | |
|---|---|---|---|
| 2002/0199102 A1* | 12/2002 | Carman | H04L 9/083 713/168 |
| 2007/0033418 A1 | 2/2007 | Okawa | |
| 2007/0186105 A1* | 8/2007 | Bailey | H04L 63/0492 713/168 |
| 2008/0298587 A1* | 12/2008 | Luk | H04L 9/083 380/255 |
| 2009/0013210 A1* | 1/2009 | McIntosh | H04L 12/2697 714/4.1 |
| 2011/0119504 A1 | 5/2011 | Nishimura | |
| 2011/0126009 A1* | 5/2011 | Camp, Jr. | H04L 9/0825 713/168 |
| 2011/0126014 A1* | 5/2011 | Camp, Jr. | H04M 1/7253 713/171 |
| 2011/0176675 A1* | 7/2011 | Hughes | H04L 9/0822 380/44 |
| 2012/0002812 A1* | 1/2012 | Bell, Jr. | H04L 9/06 380/268 |
| 2012/0190299 A1* | 7/2012 | Takatsuka | H04B 5/00 455/41.1 |
| 2013/0013933 A1* | 1/2013 | Adams | H04L 9/0891 713/189 |
| 2013/0064365 A1 | 3/2013 | Song | |
| 2013/0246543 A1* | 9/2013 | Pasek | H04L 51/04 709/206 |
| 2014/0059354 A1 | 2/2014 | Jiang et al. | |
| 2014/0093079 A1* | 4/2014 | Scott | H04L 63/08 380/270 |
| 2014/0207635 A1* | 7/2014 | Pappas | G07C 1/00 705/32 |
| 2015/0074404 A1* | 3/2015 | Kasper | H04L 63/08 713/170 |
| 2015/0113592 A1* | 4/2015 | Curtis | H04L 63/0823 726/2 |
| 2016/0156619 A1* | 6/2016 | Lovelock | G06F 21/34 726/7 |

OTHER PUBLICATIONS

Chen, Wen-Huei, and Yu-Jen Chen. "A bootstrapping scheme for inter-sensor authentication within sensor networks." IEEE communications letters 9.10 (2005): 945-947.*

Delgado-Mohatar, Oscar, Amparo Fúster-Sabater, and José M. Sierra. "A light-weight authentication scheme for wireless sensor networks." Ad Hoc Networks 9.5 (2011): 727-735.*

Jehangir, Assed, and Sonia M. Heemstra De Groot. "Securing personal network clusters." Security and Privacy in Communications Networks and the Workshops, 2007. SecureComm 2007. Third International Conference on. IEEE, 2007.*

Jurnecka, Filip, and Vashek Matyáš. "A Better Way towards Key Establishment and Authentication in Wireless Sensor Networks." International Doctoral Workshop on Mathematical and Engineering Methods in Computer Science. Springer Berlin Heidelberg, 2012.*

Park, Han, and JooSeok Song. "An Enhanced Key Management Scheme Based on Key Infection in Wireless Sensor Network." World Academy of Scicence, Enginerring and Technology 60 (2009): 249-254.*

Thomas, David, and Egil Hansen. "Thingies for Dummies: a smart home infrastructure for the rest of us.", 2012.*

Wang, Weiping, et al. "Security in Wireless Sensor Networks." Wireless Network Security. Springer Berlin Heidelberg, 2013. 129-177.*

International Search Report and Written Opinion of the International Searching Authority for PCT/US2015/022827 dated Jun. 22, 2015.

* cited by examiner

ANTI-TAKEOVER SYSTEMS AND METHODS FOR NETWORK ATTACHED PERIPHERALS

CROSS REFERENCE

This application claims priority from U.S. Provisional Patent Application No. 61/972,128 entitled "ANTI-TAKEOVER SYSTEMS AND METHODS FOR NETWORK ATTACHED PERIPHERALS," which was filed 28 Mar. 2014, and assigned to the assignee hereof.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor an aspect of a home or business. Protection mechanisms preventing competitors from taking over and utilizing automation and security system peripheral devices while simultaneously allowing such devices to be installed in a temporarily operational state may not be available.

SUMMARY

The systems and methods described herein relate to home automation and home security. More specifically, the systems and methods described herein relate to the prevention of network peripheral takeover activity. Peripheral devices may include anti-takeover mechanisms and generic devices without anti-takeover mechanisms.

In some embodiments, a peripheral device, such as a sensor, transmits data packets wirelessly upon detection of an event at the sensor. For example, a door sensor may transmit a data packet when a door opens, when a door closes, or both. The packet may include several information elements including, for example, the peripheral device identifier, type, and status. In some instances, the identifier is a radio frequency identification. In certain implementations, transmissions are broadcast to any radio frequency listening device, such as a controller panel, within the transmission range of the peripheral device.

In some embodiments, the anti-takeover peripheral devices implement an anti-takeover mechanism limiting the period of time unencrypted messages are transmitted to listening devices. To prevent unauthorized peripheral takeover by a controller device, anti-takeover peripheral devices may use a decryption key value such as a pin number, randomly generated by each peripheral device, to secure data packet transmissions. The decryption key value may be used as a unique input to an encryption algorithm used to encrypt data transmissions. In certain instances, the decryption key is transmitted to a listening device, such as a controller device, for a set period of time in advance of encrypting the anti-takeover peripheral device data transmissions. This peripheral device mechanism may operate by transmitting unencrypted data packets for a pre-defined unencrypted data transmission period. One or more unencrypted data packets transmitted during the peripheral device unencrypted data transmission period may include the decryption key value. This decryption key value may be stored at one or more of the anti-theft controller devices receiving the transmission, a controller device communicatively coupled to the receiving controller device, or a remote data store. These networks may also include generic peripheral devices that do not include an anti-takeover mechanism that transmit unencrypted data packets perpetually or for an undefined period of time.

In some embodiments, anti-takeover peripheral devices include multiple operational modes, such as, for example, a plain mode, a decryption key transmission mode, and a secure mode. The plain mode may transmit unencrypted data packets perpetually or for an undefined period of time, or until the peripheral device is transitioned to a different mode. The decryption key transmission mode may transfer unencrypted data packets for a pre-defined unencrypted data transmission period, and may include a decryption key value, such as a pin number, in the unencrypted data packet. The secure mode may transmit encrypted data packets that do not include a decryption key value. In some instances, this anti-takeover functionality is effectuated by one or more transitions between at least two of these modes. In certain cases, the anti-takeover peripheral device remains in secure mode for the useful life of the peripheral device.

Anti-takeover controller devices, generic controller devices, or both, may be installed in a network where anti-takeover peripheral devices are active and prior to the termination of the pre-defined unencrypted data transmission period for one or more active anti-takeover peripheral devices. Both anti-takeover controller devices and generic controller devices may operate properly during the pre-defined unencrypted data transmission period. At the termination of said period, the anti-takeover peripheral device may transition to secure mode, encrypting data packets prior to transmission. If the anti-takeover controller device stored the decryption key value transmitted during the pre-defined unencrypted data transmission period, the anti-takeover controller may decrypt the packets and operate in accordance with the content of received messages. The generic controller will not have the decryption key value, nor the associated decryption algorithm, for packet decryption, and will therefore not operate properly, thus preventing use of the anti-takeover peripheral by the generic controller device.

Anti-takeover controller devices, generic controller devices, or both, may be installed in a network where anti-takeover peripheral devices are present and subsequent to the termination of the pre-defined unencrypted data transmission period for one or more anti-takeover peripheral devices. In some embodiments the anti-takeover controller device retrieves the decryption key value for the anti-takeover peripheral device from a remote storage service. This decryption key value may then be used to decrypt encrypted packets transmitted by the anti-takeover peripheral device associated with the decryption key value. If the anti-takeover controller device is not able to obtain the decryption key value, the anti-takeover controller may not be able to decrypt the encrypted data packets. The generic controller will not have the decryption key value, nor the decryption algorithm, for packet decryption, and will therefore not operate properly, thus preventing takeover of the anti-takeover peripheral.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
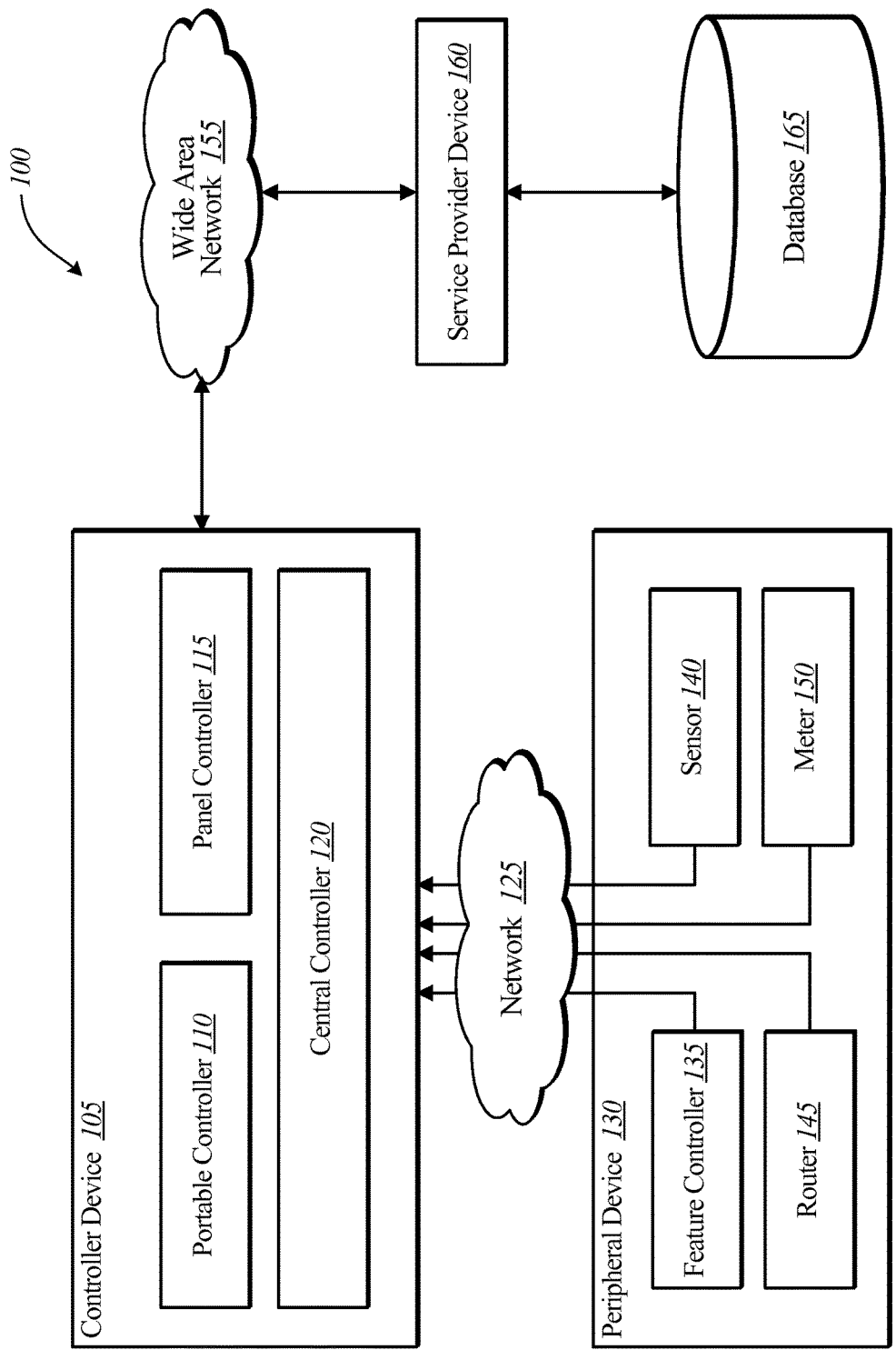
FIG. 1 is a block diagram of a networked environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation and home security. More specifically, the systems and methods described herein relate to the prevention of network peripheral takeover activity.

FIG. 1 is a block diagram illustrating one embodiment of an environment 100 in which the present systems and methods may be implemented. In some embodiments, the systems and methods described herein may be performed on a peripheral device 130 (e.g., feature controller 135, sensor 140, router 145, meter 150) in communication with a controller device 105 (e.g., portable controller 110, panel controller 115, central controller 120) over a network 125, such as, for example, an radio frequency Z-Wave network or other local area network. Peripheral devices may include anti-takeover peripheral devices and generic peripheral devices without anti-takeover mechanisms. Similarly, controller devices may include anti-takeover controller devices and generic controller devices without anti-takeover storage and decryption mechanisms.

Still referring to FIG. 1, the environment 100 may include a service provider device 160 and database 165 (e.g., a remote database) accessible over a wide area network 155, such as, for example, the Internet. In some instances, controller devices 105 communicate with a remote storage service exposed by the service provider device 160, which stores and retrieves information such as, for example, network peripheral identification information and associated decryption key values.

In some embodiments, examples of sensor 140 include a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, and the like.

Sensor 140 may represent one or more separate sensors or a combination of two or more sensors in a single sensor device. For example, sensor 140 may represent one or more camera sensors and one or more motion sensors connected to environment 100. Additionally, or alternatively, sensor 140 may represent a combination sensor such as both a camera sensor and a motion sensor integrated in the same sensor device. Additionally, or alternatively, sensor 140 may be integrated with a home appliance or fixture such as a light bulb fixture. Sensor 140 may include an accelerometer enabling sensor 140 to detect a movement. Sensor 140 may include a wireless communication device enabling sensor 140 to send and receive data and/or information to and from one or more devices in environment 100. Additionally, or alternatively, sensor 140 may include a GPS sensor enabling sensor 140 to track a location of sensor 140. Sensor 140 may include a proximity sensor enabling sensor 140 to detect proximity of a person relative to a predetermined distance from a dwelling (e.g., geo-fencing). Sensor 140 may include one or more security detection sensors such as, for example, a glass break sensor, a motion detection sensor, or both. Additionally, or alternatively, sensor 140 may include a smoke detection sensor, a carbon monoxide sensor, or both.

Feature controller 135 may represent one or more separate feature controls or a combination of two or more feature controls in a single feature controller device. For example, feature controller 135 may represent one or more camera controls and one or more door lock controls connected to environment 100. Additionally, or alternatively, feature controller 135 may represent a combination feature controller such as both a camera control and a door lock control integrated in the same feature controller device. Additionally, or alternatively, feature controller 135 may be integrated with a home appliance or fixture such as a light bulb fixture. Feature controller 135 may include a lighting control mechanism configured to control a lighting fixture. Feature controller 135 may include a wireless communication device enabling feature controller 135 to send and receive data and/or information to and from one or more devices in environment 100. Additionally, or alternatively, feature controller 135 may include an appliance control interface enabling feature controller 135 to send commands to an integrated appliance interface. Feature controller 135 may include an interface to a security system to monitor, activate, modify and/or arm one or more security features.

Router 145 may represent one or more peripherals functioning as a router when a controller device 105 attempts to reach a peripheral device 130 where the controller device is out of direct range of the peripheral device. The router 145 may have the same functionality as a non-routing device (e.g., feature controller 135, sensor 140, and/or meter 150), but in addition the router 145 may initiate transmission of data to one or more other peripheral devices 130 in the network. In some instances, the router 145 may be mains powered, battery powered, or both. In some cases, the router may include an external EEPROM for storing application data.

Meter 150 may represent a peripheral device configured to realize various types of meters, such as gas, water and electricity meters. In some instances, a meter 150 is a pulse meter reporting pulses having a specific meaning for a specific meter type.

In some embodiments, controller device 105 may communicate with service provider device 160 via network 155. Examples include cloud networks, local area networks (LAN), wide area networks (WAN), virtual private networks (VPN), wireless networks (using 802.11, for example), and/or cellular networks (using 3G and/or LTE, for example), etc. In some configurations, the network 155 may include the Internet.

In some instances, the environment 100 will include one or more static controllers, such as panel controllers 115 and central controllers 120, residing in fixed locations within the system. The controllers 115, 120 may serve as receivers for sensors and battery-operated devices that send transmissions to a controller, and may also act as an internet gateway, which can be accessed remotely. The controllers 115, 120 may also provide routing support between devices in the environment 100. This may include collecting peripheral information, maintaining a routing table, creating routing lists and using routing lists for data transmissions. The environment 100 may also include one or more portable controllers 110 that do not maintain fixed locations.

In some embodiments, service provider device 160 may be communicatively coupled to database 165. Database 165 may store data associated with the peripheral devices, monitored activities of a property, or both. For example, controller device 105 may access data in database 165 over network 155 via service provider device 160. Database 165 may be internal or external to the service provider device 160.

Figure 2:
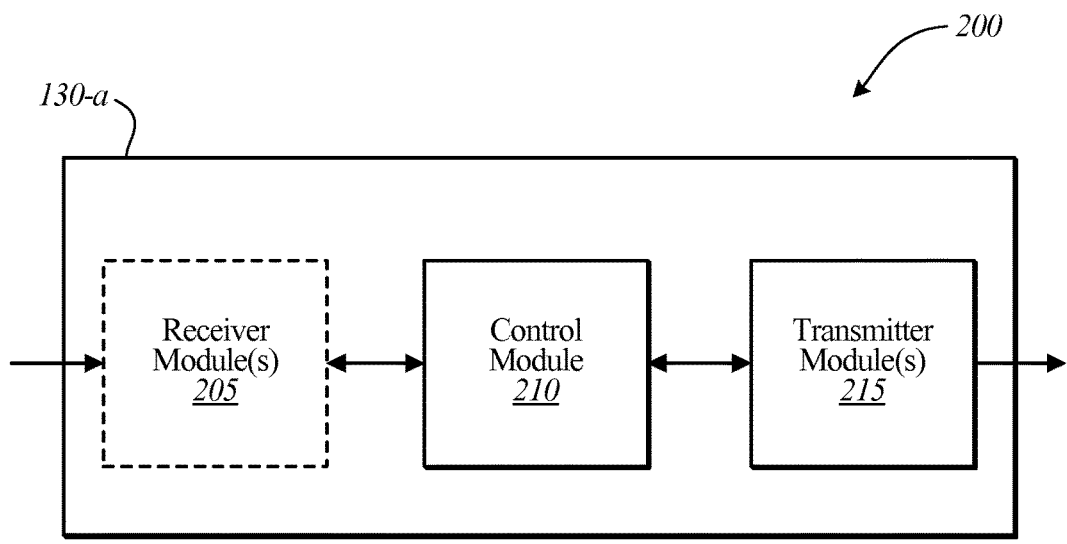
FIG. 2 is a block diagram of an example of an anti-takeover peripheral device in the networked environment of FIG. 1.

Referring now to FIG. 2, a block diagram 200 illustrates an anti-takeover peripheral device 130-a capable of encrypting data packets and transitioning between operational modes in accordance with various embodiments. The anti-takeover peripheral device 130-a may be an example of one or more aspects of one of the anti-takeover peripheral devices described with reference to FIG. 1. The anti-takeover peripheral device 130-a may include one or more optional receiver modules 205, a control module 210, and one or more transmitter modules 215. Each of these components may be in communication with each other.

The components of the anti-takeover peripheral device 130-a may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The optional receiver module 205 may include a 345 MHz narrow-band radio receiver. The radio receiver may be used to receive various types of data, control signals, or both. In addition, or alternatively, the optional receiver module 205 may include a cellular receiver. The cellular receiver may be used to receive various types of data, control signals (i.e., transmissions), or both over one or more communication channels of a wireless communications system. The optional receiver module 205 may also include a wireless local area network (WLAN) receiver. The WLAN receiver may also be used to receive various types of data control signals, or both.

The control module 210 may perform various functions. In some embodiments, the control module 210 operates or controls the optional receiver module 205 to receive operational commands, configuration data, and the like. The control module 210 may also operate or control the transmitter module 215 to transmit peripheral information such as, for example, device identification, mode, status, pin number, events, and the like. In addition, the control module may also generate decryption key values, transmit decryption key values, transition between operational modes, generate packets, encrypt messages, and set and monitor transmission mode timers.

The transmitter module 215 may include a 345 MHz radio transmitter. The radio transmitter may be used to transmit various types of data, control signals, or both. In addition, or alternatively, the transmitter module 215 may include a cellular transmitter. The cellular transmitter may be used to transmit various types of data, control signals (i.e., transmissions), or both over one or more communication channels of a wireless communications system. The transmitter module 215 may also include a wireless local area network (WLAN) transmitter. The WLAN transmitter may also be used to transmit various types of data control signals, or both.

Figure 3:
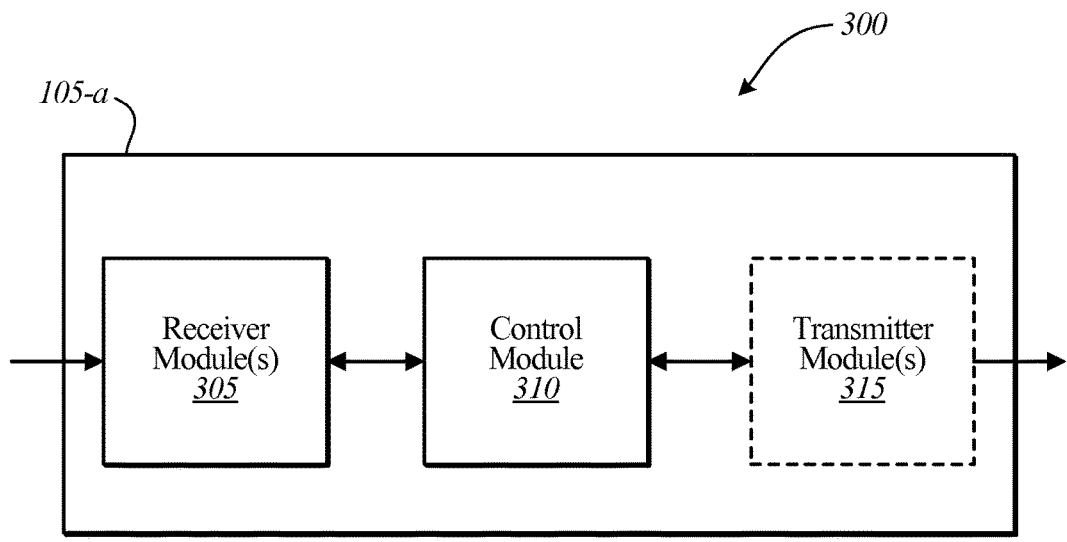
FIG. 3 is a block diagram of an example of a anti-takeover controller device in the networked environment FIG. 1.

Referring now to FIG. 3, a block diagram 300 illustrates an anti-takeover controller device 105-*a* capable of receiving unencrypted and encrypted packets, parsing messages, storing decryption key values, decrypting packages, and the like, in accordance with various embodiments. The anti-takeover controller device 105-*a* may be an example of one or more aspects of one of the anti-takeover controller devices described with reference to FIG. 1. The anti-takeover controller device 105-*a* may include one or more receiver modules 305, a control module 310, and one or more optional transmitter modules 315. Each of these components may be in communication with each other.

The components of the anti-takeover controller device 105-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 305 may include a 345 MHz narrow-band radio receiver. The radio receiver may be used to receive various types of data, control signals, or both. In addition, or alternatively, the receiver module 305 may include a cellular receiver. The cellular receiver may be used to receive various types of data, control signals (i.e., transmissions), or both over one or more communication channels of a wireless communications system. The optional receiver module 305 may also include a wireless local area network (WLAN) receiver. The WLAN receiver may also be used to receive various types of data control signals, or both.

The control module 310 may perform various functions. In some embodiments, the control module 310 operates or controls the receiver module 305 to receive operational commands, configuration data, and the like. The control module 310 may also operate or control the optional transmitter module 315 to transmit peripheral information such as, for example, device identification, mode, status, pin number, events, and the like. In addition, the control module may also store and retrieve peripheral device decryption key values, decrypt and parse messages received from one or more peripheral devices, and execute alarm logic in accordance with one or more message elements.

The transmitter module 315 may include a 345 MHz radio transmitter. The radio transmitter may be used to transmit various types of data, control signals, or both. In addition, or alternatively, the transmitter module 315 may include a cellular transmitter. The cellular transmitter may be used to transmit various types of data, control signals (i.e., transmissions), or both over one or more communication channels of a wireless communications system. The transmitter module 315 may also include a wireless local area network (WLAN) transmitter. The WLAN transmitter may also be used to transmit various types of data control signals, or both.

Figure 4:
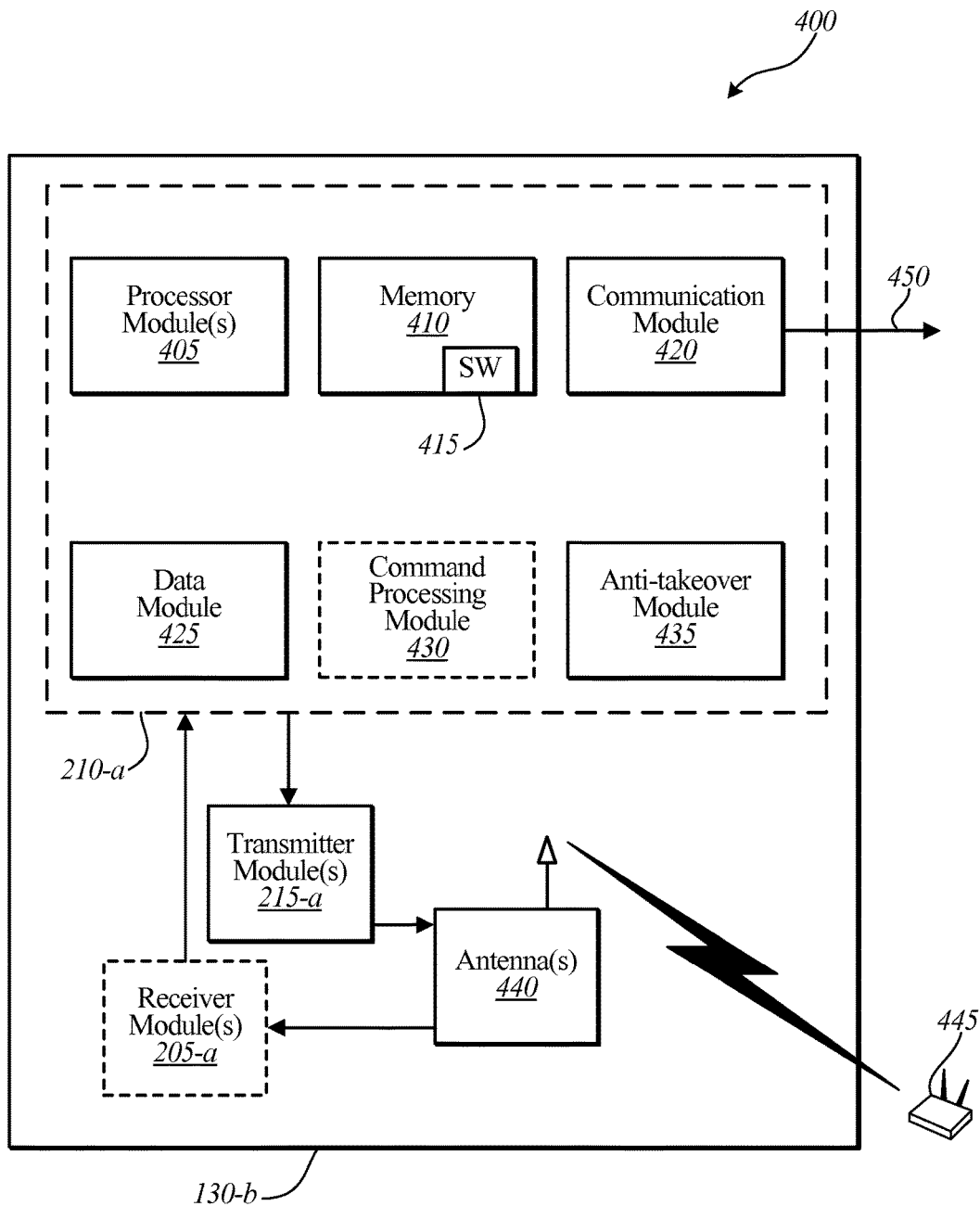
FIG. 4 is an example of a wireless communications system and an anti-takeover peripheral device of FIG. 2.

Referring now to FIG. 4, an exemplary anti-takeover peripheral device 130-*b* is illustrated in accordance with various embodiments, and may be an example of a system 400 that forms at least a part of the environment 100 of FIG. 1. Anti-takeover peripheral device 130-*b* may communicate wirelessly with one or more controller devices 105. Anti-takeover peripheral device may be an example of a peripheral device 130 of FIG. 1 or FIG. 2. In some implementations, anti-takeover peripheral device 130-*b* includes one or more antenna(s) 440 communicatively coupled to optional receiver module(s) 205-*a* and transmitter module(s) 215-*a*, which are in turn communicatively coupled to a control module 210-*a*. In some instances, the optional receiver module 205-*a* and the transmitter module 215-*a* include a transceiver (not shown). Control module 210-*a* may include one or more processor module(s) 405, a memory 410 that may include software 415, a communication module 420, an optional command processing module 430, a data module 425, and an anti-takeover module 435. The software 415 may be for execution by processor module 405, anti-takeover module 435, or data module 425.

The processor module(s) 405 may include an intelligent hardware device, e.g., a central processing unit (CPU), a microcontroller, an application specific integrated circuit (ASIC), etc. The memory 410 may include random access memory (RAM) and read-only memory (ROM). The memory 410 may store computer-readable, computer-executable software code 415 containing instructions that are configured to, when executed (or when compiled and executed), cause the processor module 405, communication module 420, data module 425, optional command processing module 430, or anti-takeover module 435 to perform various functions described herein (e.g., decryption key value generation, unencrypted data packet generation, encrypted data packet generation, data packet transmission, operational mode transitioning, etc.). The anti-takeover module 435, optional command processing module 430, data module 425, or communication module 420 may be implemented as a part of the processor module(s) 405, or may be implemented using one or more separate CPUs or ASICs, for example. The transmitter module(s) 215-*a* may transmit to a WiFi/WLAN access points 445 to establish communications with one or more wireless communications networks, to other controller devices or peripheral devices using a radio frequency transmitter, or both.

The anti-takeover module 435 may be configured to detect external events, manage mode transitions, generate decryption key values, set timers, generate packets, encrypt messages, and the like. In some embodiments, mode transitions are based at least in part on commands received by the optional command processing module 430. The optional command processing module 430 may be configured to receive peripheral device component manipulations defined as mode transition triggering actions. For example, in some embodiments, detection of the connection of the ground and reset test points of one or more programming test pins by a wire or configuration tool and maintained for a defined period of time is interpreted as a command to change a peripheral device mode from a plain mode to a decryption key transmission mode. The anti-takeover module 435 may communicate with and direct the data module 425 to store decryption key values, event data, and other information involved in the operation of the anti-takeover mechanism and security system generally. The data module 425 may also provide data retrieval methods for the other peripheral device modules. The anti-takeover module 435 may pass information to the communication module 420 and direct the communication module 420 to forward prepared messages to the transmitter module 215-*a* for transmission to a network, one or more listening devices, or both.

The optional receiver module(s) 205-*a* may receive transmissions from one or more controller devices 105-*b*, network access points 445, or both, and pass the received transmission message to the communication module 420 for distribution to and processing by modules of the control module 210-*a*. The components of anti-takeover peripheral device 130-*b* may, individually or collectively, be implemented with one or more Application Specific Integrated Circuits (ASICs) adapted to perform some or all of the applicable functions in hardware. Each of the noted modules may be a means for performing one or more functions related to operation of the anti-takeover peripheral device 130-*b*.

Figure 5:
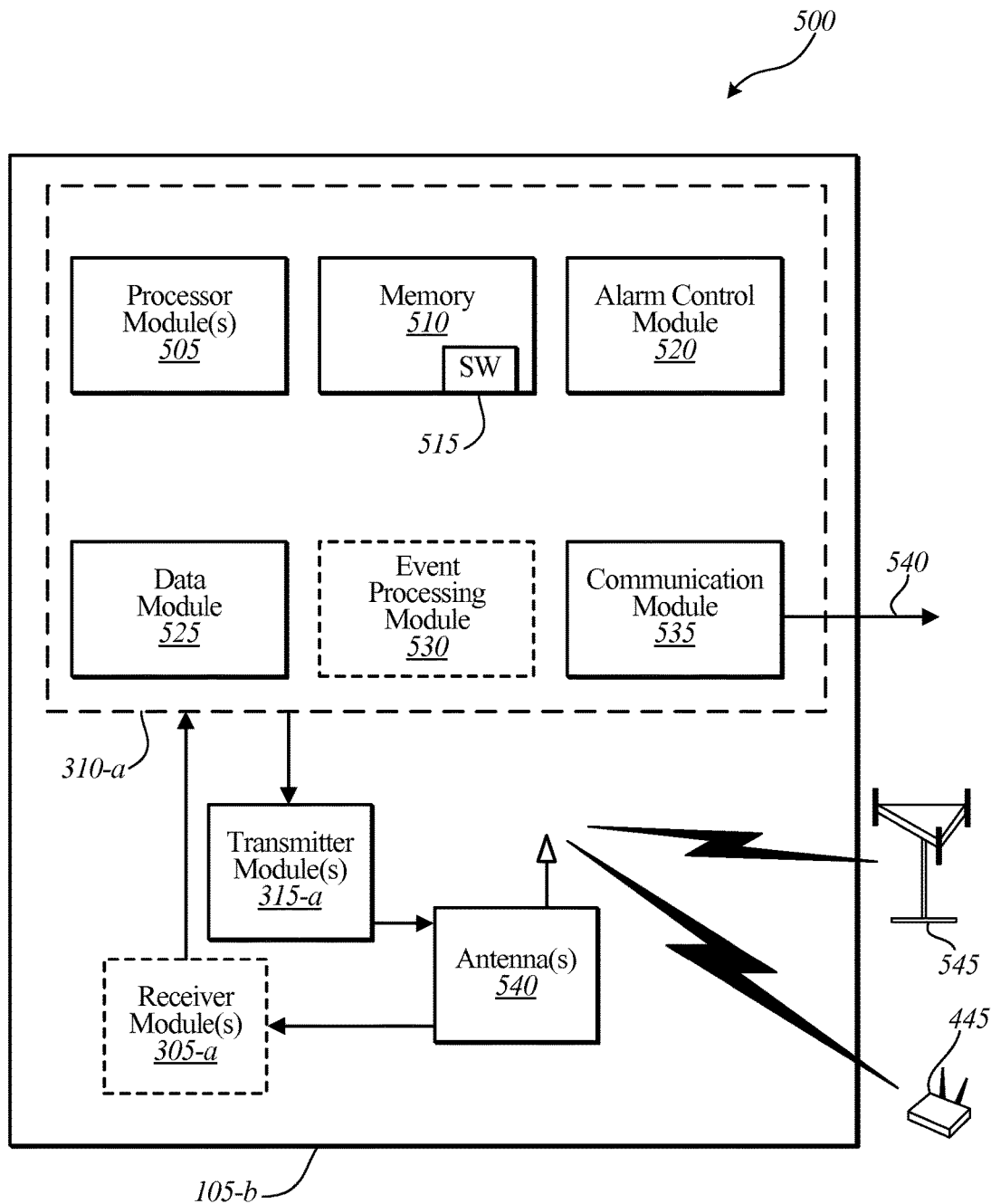
FIG. 5 is an example of a wireless communications system and an anti-takeover controller device of FIG. 3.

Referring now to FIG. 5, an exemplary anti-takeover controller device 105-*b* is illustrated in accordance with various embodiments, and may be an example of a system 500 that forms at least a part of the environment 100 of FIG. 1. Anti-takeover controller device 105-*b* may communicate wirelessly with one or more peripheral devices 130. Anti-takeover controller device may be an example of a controller device 105 of FIG. 1 or FIG. 2. In some implementations, anti-takeover controller device 105-*b* includes one or more antenna(s) 540 communicatively coupled to receiver module(s) 305-*a* and optional transmitter module(s) 315-*a*, which are in turn communicatively coupled to a control module 310-*a*. In some instances, the receiver module 305-*a* and the transmitter module 315-*a* include a transceiver (not shown). Control module 310-*a* may include one or more processor module(s) 505, a memory 510 that may include software 515, an alarm control module 520, a data module 525, an event processing module 530, and a communication module 535. The software 515 may be for execution by processor module 505, alarm control module 520, event processing module 530, or data module 525.

The processor module(s) 505 may include an intelligent hardware device, e.g., a central processing unit (CPU), a microcontroller, an application specific integrated circuit (ASIC), etc. The memory 510 may include random access memory (RAM) and read-only memory (ROM). The memory 510 may store computer-readable, computer-executable software 515 containing instructions that are configured to, when executed (or when compiled and executed), cause the processor module 505, communication module 535, data module 525, alarm control module 520, or the event processing module 530 to perform various functions described herein (e.g., receiving unencrypted and encrypted packets, parsing messages, storing decryption key values, decrypting packages, etc.). The alarm control module 520, event processing module 530, data module 525, or communication module 535 may be implemented as a part of the processor module(s) 505, or may be implemented using one or more separate CPUs or ASICs, for example. The transmitter module(s) 315-*a* may transmit to a WiFi/WLAN access points 445 or to one or more base stations 545 to establish communications with one or more wireless communications networks, or to other controller devices 105-*b* using a radio frequency transmitter.

The event processing module 530 may be configured to decrypt received messages, parse decrypted messages, store and retrieve decryption key values, and the like. In some embodiments, the event processing module 530 transfers the decryption key value to the alarm control module 520. The decryption key value (e.g., a pin number) may be stored in a volatile cache memory by the alarm control module. In some instances, the decryption key value is passed to the communication module 535, which prepares the message for transmission to remote storage location by the transmitter module 315-*a*. In some instances, transmissions of the decryption key value by the controller device 105-*b* are initiated by a request from service provider device 160 (e.g., see FIG. 1).

The event processing module 530, alarm control module 520, or both may communicate with and direct the data module 525 to store and retrieve decryption key values, event data, and other information involved in the operation of the anti-takeover mechanism and security system generally. The event processing module 530, alarm control module 520, or both may pass information to and direct the communication module 535 to forward prepared messages to the transmitter module 215-*a* for transmission to at least one of a network, a service provider device 160, or a listening devices.

The receiver module(s) 305-*a* may receive transmissions from one or more peripheral devices 130, other controller devices 105, network access points 445, and/or base stations 545, and pass the received transmission message to the communication module 535 for distribution to and processing by modules of the control module 310-*a*. The components of anti-takeover controller device 105-*b* may, individually or collectively, be implemented with one or more Application Specific Integrated Circuits (ASICs) adapted to perform some or all of the applicable functions in hardware. Each of the noted modules may be a means for performing one or more functions related to operation of the anti-takeover controller device 105-*b*.

Figure 6:
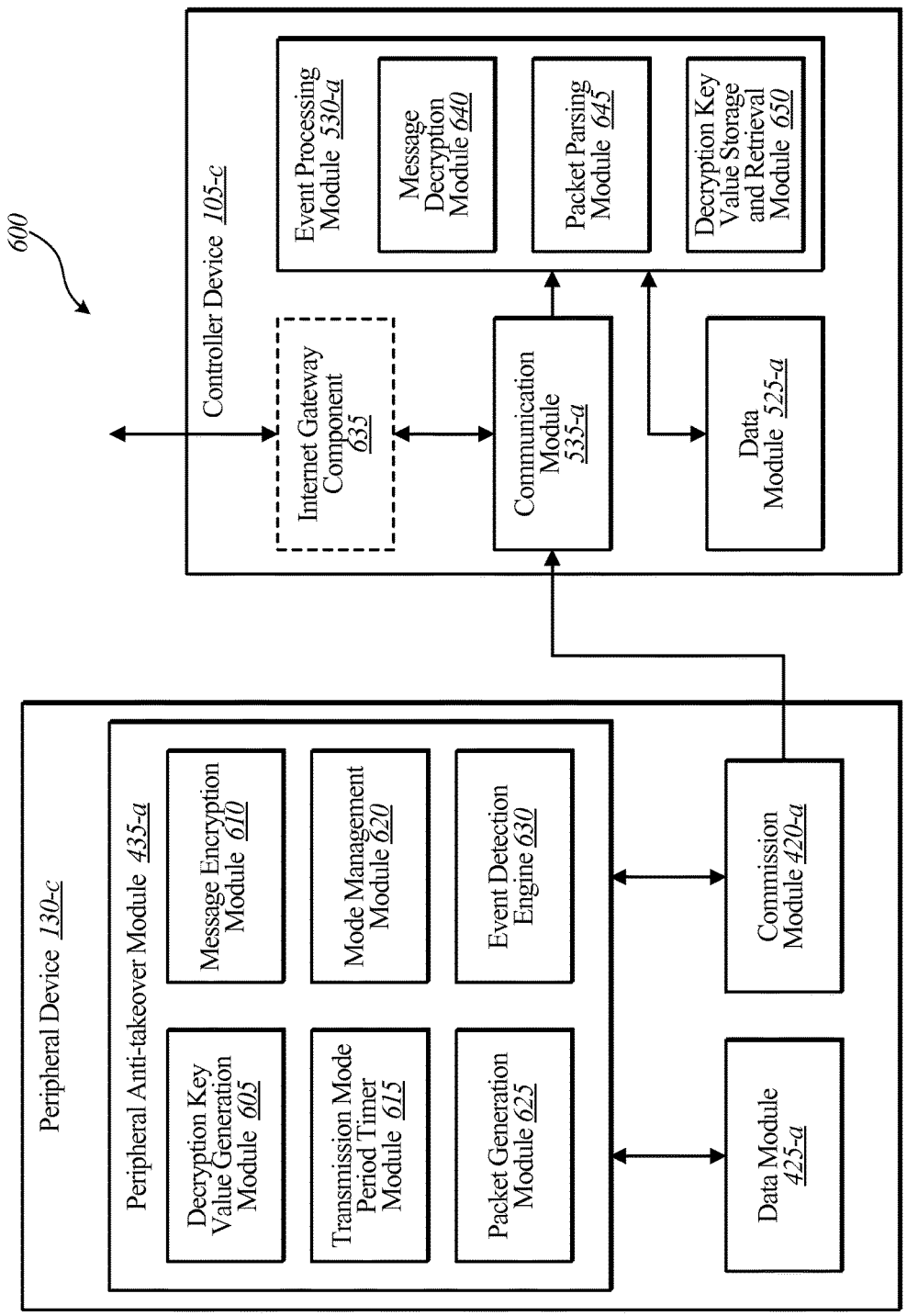
FIG. 6 is a block diagram of one example of component architecture for an anti-takeover controller device of FIG. 5 and an anti-takeover peripheral device of FIG. 4 in the networked environment of FIG. 1.

Referring now to FIG. 6, in some embodiments, an example peripheral anti-takeover module 435-a (e.g., of the control module 210 shown in FIG. 2) of a peripheral device 130-c includes a decryption key value generation module 605, a message encryption module 610, a transmission mode period timer module 615, a mode management module 620, a packet generation module 625, and an event detection engine 630. The event detection engine 630 may detect events such as peripheral device events (e.g., door open and door close), component connection events (e.g., manual pin connections), and the like. For purposes of anti-takeover methods, information associated with detected events may be passed to the mode management module 620.

In certain instances, the mode management module 620 receives a message from the event detection engine 630. The mode management module 620 may compare one or more of message content, message timing, message order, or message pattern to pre-defined mode transition trigger definitions. If one or more of the received messages matches a pre-defined mode transition trigger definition, the mode management module 620 may transition the operational mode of the peripheral device in accordance with the pre-defined mode transition trigger definitions. In some embodiments, anti-takeover device factory settings configure the peripheral device to initially operate in plain mode.

Upon detection of one or more events matching a predefined mode transition trigger definition, the mode management module 620 may transition from the plain mode to the decryption key transmission mode. At or about the time of this mode transition, the mode management module 620 may direct the transmission mode period timer module 615 to start a transmission mode period timer. In some instances, this timer is set to a value defined at the time of manufacturing, such as 6 months. In other instances, this timer is set to a value determined by the mode management module 620. The mode management module 620 may, at certain intervals or upon the occurrence of certain events, monitor the transmission mode period timer. Alternatively, or in addition, the transmission mode period timer module 615 may notify the mode management module 620 of transmission mode period timer expiration.

In some embodiments, a decryption key value generation module 605 generates the decryption key value used in the encryption and decryption of messages. In certain implementations, the encryption key is 128 bits in length and is based, at least in part, on a 16 bit decryption key value, such as a pin number, and a 16 bit key serial number associated with the peripheral device that is incremented upon the occurrence of certain events, such as door open and door close events in the case of a door sensor. The first 16 bits in the encryption key may include the decryption key value. One of the next 5 sets of 16 bits may include the key serial number value added to decryption key value. In certain implementations, the encryption key may be modified after a pre-defined number of events, such as a set number of door open/close events.

In some instances, the generation of the decryption key value, such as a pin number, occurs by executing an exclusive OR operation on an open analog input channel and a pseudo random number. The analog input may be noise on the channel and the pseudo random number may change by, for example, 696 every 250 milliseconds.

In some embodiments, the key serial number is incremented by the sensor upon detection of a peripheral device event, such as, for example, door open/close events. The key serial number may track the iteration of the encryption such that the controller device 105-c may synchronize with the peripheral device 130-c. In some embodiments, peripheral device 130-c may include a data module 425-a and a commission module 420-a that communicate with the peripheral anti-takeover module 435-a. Data module 425-a may be an example of the data module 425 described with reference to FIG. 4, and commission module 420-a may be an example of the commission module 420-a described with reference to FIG. 4. At least the commission module 420-a may link the peripheral device 130-c to the controller device 105-c via, for example, communications with communication module 535-a. In certain implementations, when the controller device 105-c receives an encrypted message from peripheral device 130-c, the controller device 105-c advances its encryption iteration to match the peripheral device 130-c and proceeds to decrypt the message. The key serial number can be transferred from the controller device 105-c to a remote data store (e.g., database 165; see FIG. 1) at fixed intervals, upon request from service provider device 160, or both. In certain instances, these transfers are imitated after a peripheral device 130-c has transitioned to a decryption key transmission mode.

In certain implementations, a message encryption module 610 encrypts messages using an encryption algorithm such as, for example, the rabbit stream cipher algorithm. In such an implementation, the cipher data in the rabbit encryption can consist of a cipher, count, carry, key serial number, key, buffer, and decryption key value such as a pin number. When the peripheral device 130-c transmits an encrypted message, the message may contain a key serial number value. The key serial number may be incremented at certain peripheral events, such as each door open/close event in the case of door sensors. The control device receiving the message may synchronize with the peripheral device by using the key serial number value. The power-on value for the key serial number in the peripheral device may be, for example 6, such that the first secure packet will have a key serial number value of 6.

An anti-takeover peripheral device, in some instances, may start a 26 week transmission mode period timer and transmit its decryption key value at fixed intervals, such as once a week, until the timer expires. Decryption key values may be stored in the controller device in cache, in a local persistent data store, or both. The decryption key values may be preserved in controller device memory such that even when power cycled, the decryption key values can be transmitted to the remote data store after power up.

With respect to cipher data, the controller device 105-c and remote service provider device 160 (e.g., see FIG. 1) may both create the cipher data from the decryption key value and key serial number. The decryption key value is the decryption key for decrypting message at the controller device. The controller device 105-c and remote service provider device 160 may both generate the cipher, carry, key serial number, key, and buffer from the decryption key value and key serial number.

In some embodiments, the remote database 165 (e.g., see FIG. 1) is the primary storage location for the key serial number and the decryption key value for peripheral devices. As an example, in the case where a controller device, such as a panel, is damaged and replaced with a new panel, the new panel does not have any information relating to peripheral device decryption key values or key serial numbers. The panel can request the decryption key value for each peripheral device that is learned into the panel. If no key serial number values were received from the service provider device 160, the panel can wait for the first peripheral event for each peripheral device, advance the encryption iteration, and decrypt the encrypted messages. In some instances, the service provider device may increment the encryption iteration. The service provider may then transmit the decryption key value, key serial number, and cipher data to the panel, thus allowing the panel to quickly synchronize with the peripheral device.

In some instances, a packet generation module 625 generates one or more packet types for inclusion in a message. Packet types may include, for example, sensor packets, attach packets, encrypted packets, pin packets, serial number packets, and mode packets. A sensor packet may be an unencrypted packet that is transmitted repeatedly based on a pre-defined interval, such as every 2 minutes. In some instances, the sensor packet is an 8 byte packet transmitted unencrypted as a 345 MHz transmission as the supervisory in all operational modes.

In certain implementations, the packet generation module 625 generates an attach packet that is an unencrypted packet transmitted when a peripheral device 130-c event occurs, such as a door open or door close event in the case of a door sensor. Peripheral devices may transmit attach packets upon the occurrence of peripheral events in the plain mode or decryption key transmission mode. In some instances, the attach packet is a 10 byte packet reporting the alarm status for a peripheral device, reporting the peripheral device mode, or both. The first 8 bytes of an attach packet may be identical to a sensor packet, aiding backwards compatibility.

In certain implementations, the packet generation module 625 generates an encrypted packet that is transmitted when a peripheral device 130-c event occurs, such as a door open or door close event in the case of a door sensor. Peripheral devices may transmit attach packets upon the occurrence of peripheral events in the plain mode or decryption key transmission mode. In some instances, the attach packet is a 12 byte packet reporting the alarm status for a peripheral device.

The packet generation module 625 may also generate pin packets, which may include a 12 byte package with the decryption key value, serial number packets, which may include a 12 byte package with the 32 bit serial number, and a mode packet which may include a 23 byte package with peripheral device mode information. These packets may be transferred at set intervals, where such intervals may vary across packet types.

In some implementations, encrypted and unencrypted messages are prepared by a communication module 420-a and sent to a transmitter module 215 (e.g., see FIG. 4) for transmission to one or more listening devices.

In some embodiments, a controller device 105-c includes a communication module 535-a and an optional Internet gateway component 635. The communication module may facilitate data transmissions between the controller device 105-c and peripheral devices 130-c. An optional Internet gateway component 635 may provide communication support for communicating with remote management devices (not shown), service provider devices 160 (e.g. see FIG. 1), web services (not shown), and the like.

In certain instances, the event processing module 530-a of the controller device 105-c includes a message decryption module 640, a packet parsing module 645, and a decryption key value storage and retrieval module. The message decryption module 640 may receive a message containing one or more packets from the communication module 535-a. If the message is unencrypted, the message decryption module 640 may forward the message directly to the packet parsing module 645, for parsing of the message and distribution of message elements to other relevant functional modules. If the message is encrypted, the message decryption module 640 will request the appropriate decryption key value from the decryption key value storage and retrieval module 650. If the decryption key value is currently stored in the controller device cache, it is retrieved from the cache and used as an input to the decryption algorithm as described previously. If it is not in the controller device cache or local persistent memory store (e.g., data module 525-a), the decryption key value storage and retrieval module 650 requests the decryption key value from the remote data module 525-a (e.g., see FIG. 1). If no decryption key value is available, the message may not be decrypted.

Figure 7:
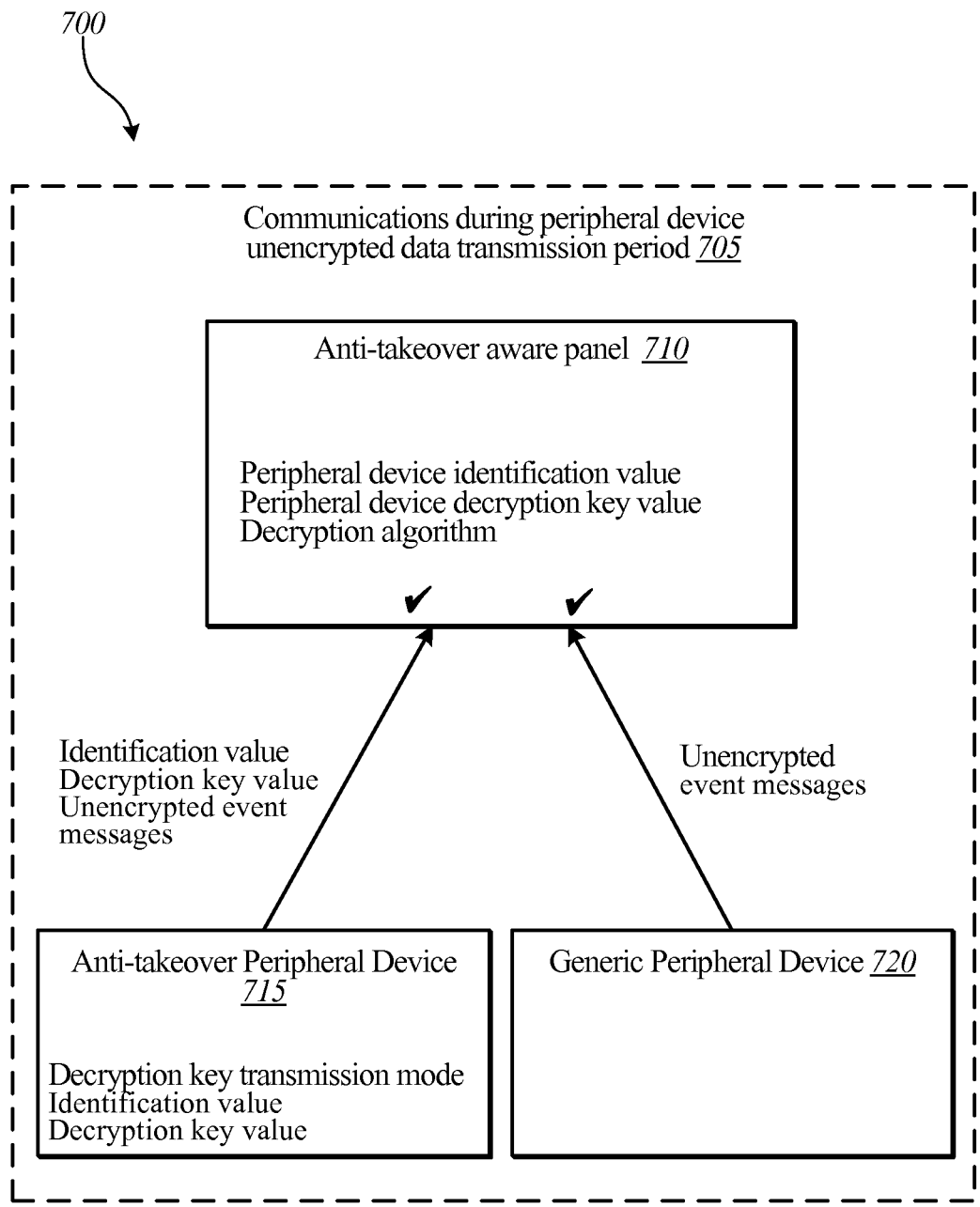
FIG. 7 is a block diagram of an anti-takeover peripheral device of FIG. 4 and a generic peripheral device in communication with an anti-takeover controller device of FIG. 5 during the peripheral device unencrypted data transmission period.

Referring now to FIG. 7, in some embodiments, an anti-takeover controller device, such as an anti-takeover aware panel 710, is deployed in an environment 700 related to communications during peripheral device unencrypted data transmission periods 705, wherein the environment 700 may include an anti-takeover peripheral device 715, a generic peripheral device 720, or both. During the time when the anti-takeover peripheral device 715 is operating in plain mode, both the anti-takeover peripheral device 715 and the generic peripheral device 720 will transmit unencrypted event messages to listening devices, such as the anti-takeover aware panel 710. Once the anti-takeover peripheral device 715 transitions to decryption key transmission mode, the device will continue to transmit unencrypted event messages, but will also transmit a key serial number and a decryption key value at various intervals. During the decryption key transition period, when the anti-takeover aware panel 710 receives the key serial number and the decryption key value, the anti-takeover aware panel 710 stores the number and the value in the panel cache, as well as transmits the number and value for storage in a remote data store.

Figure 8:
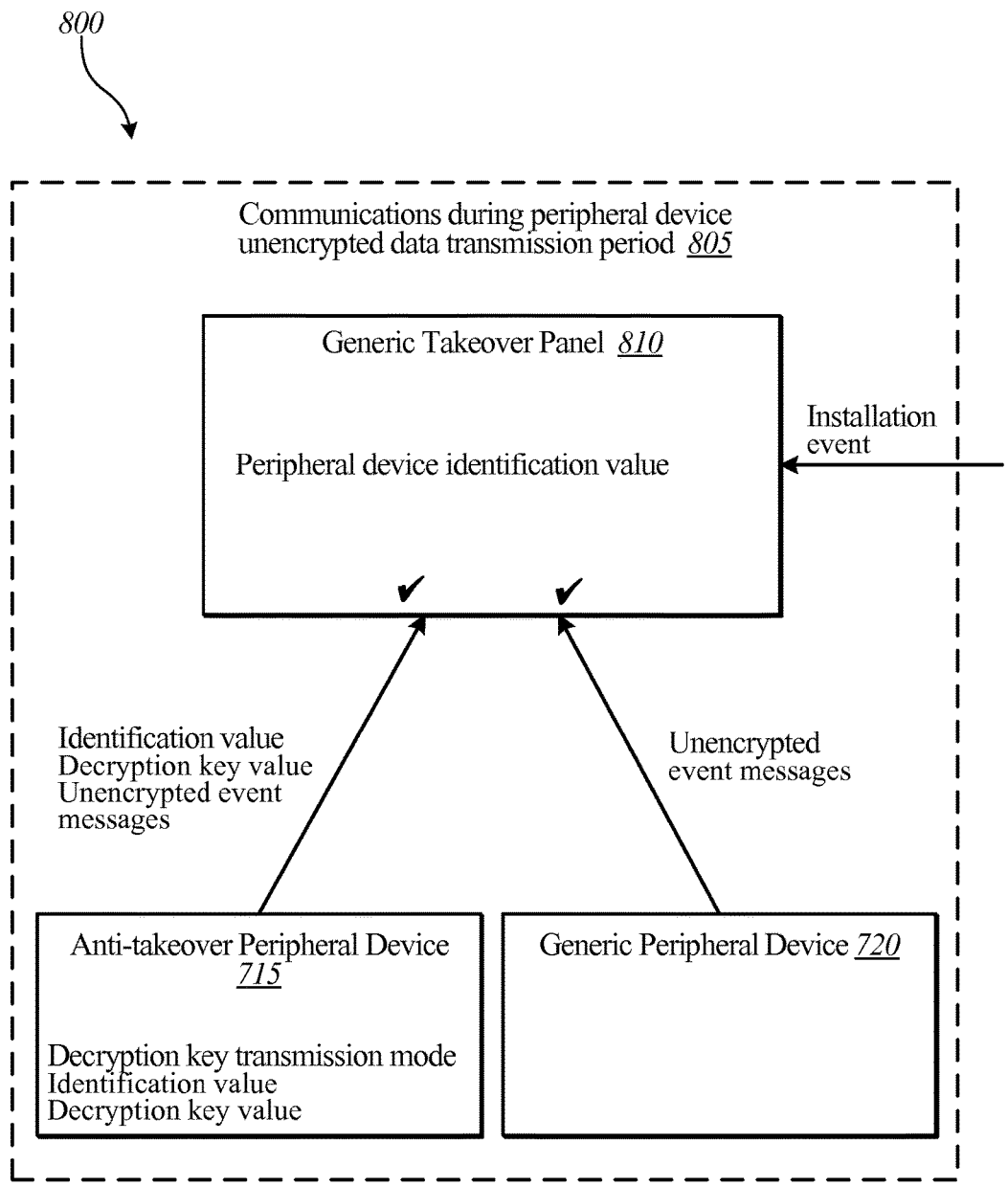
FIG. 8 is a block diagram of an anti-takeover peripheral device of FIG. 4 and a generic peripheral device in communication with a generic takeover controller device installed during the peripheral device unencrypted data transmission period.

Referring now to an environment 800 shown in FIG. 8, a generic takeover panel 810 may be installed and/or involve communications during peripheral device unencrypted data transmission period 805. The generic takeover panel 810 may operate normally during this period, properly processing unencrypted event messages from both generic peripheral devices 720 and from the anti-takeover peripheral device 715 as indicated by the two check marks. In some instances the generic takeover panel 720 may generate an error or warning as a result of unrecognized packets from the anti-takeover peripheral device 715, such as a pin packet, serial number packet, and the like.

Figure 9:
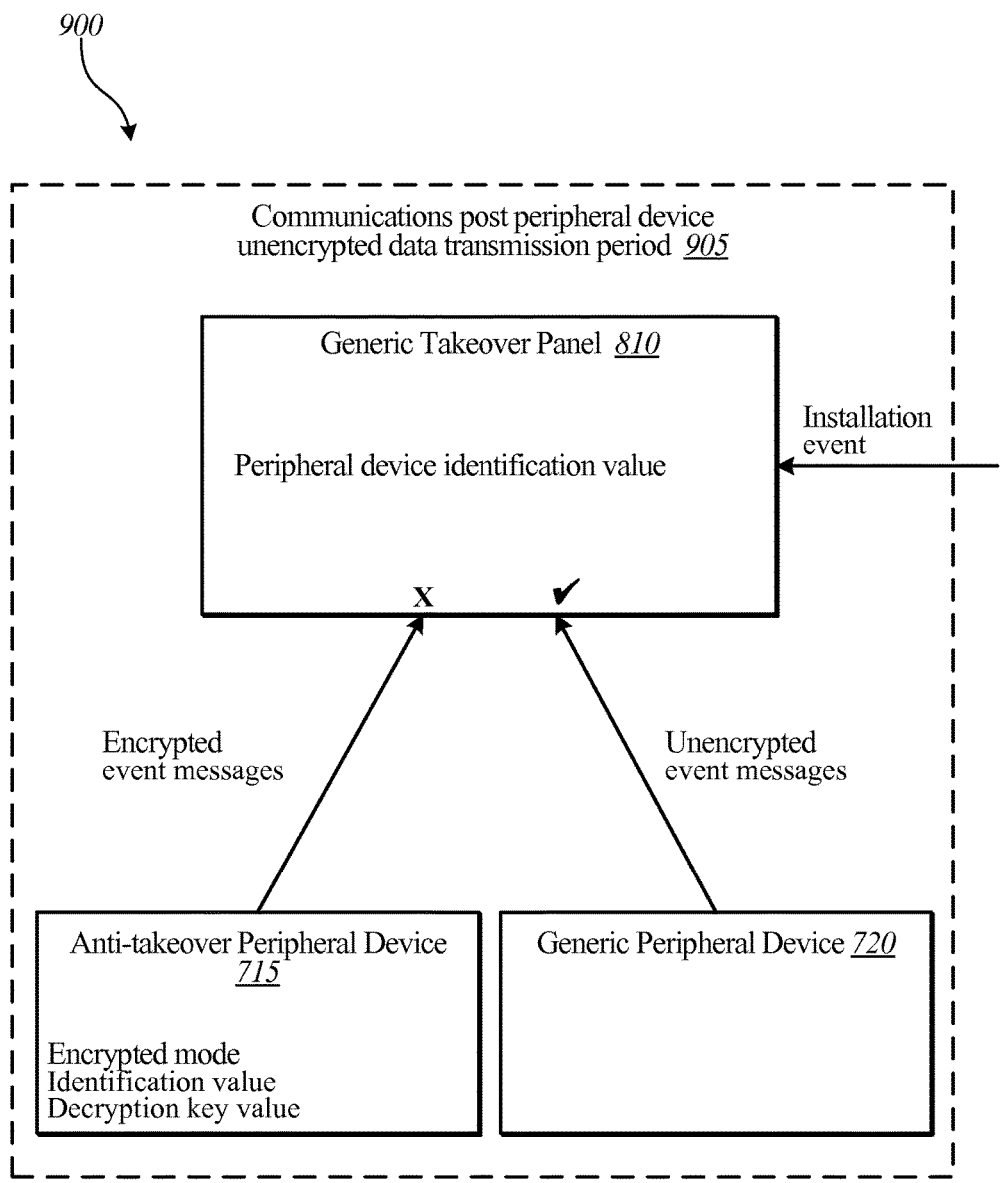
FIG. 9 is a block diagram of an anti-takeover peripheral device of FIG. 4 and a generic peripheral device in communication with the generic controller device of FIG. 8 after the peripheral device unencrypted data transmission period has expired.

Referring now to an environment 900 shown in FIG. 9, the generic takeover panel 810 installed and/or involve communications during the peripheral device unencrypted data transmission period 905 may cease to operate properly with respect to the anti-takeover peripheral device 715 transmission once the peripheral device unencrypted data transmission period expires. At the time of this expiration, the anti-takeover peripheral device 715 will cease transmitting the decryption key value, and will begin encrypting all event message transmissions. As the generic takeover panel 810 has neither the decryption algorithm nor the decryption key value to input into the decryption algorithm, the generic takeover panel 810 will be unable to decrypt the messages received from the anti-takeover peripheral device 715. The generic takeover panel 810 may operate normally with respect to generic peripheral devices 720 that continue to transmit unencrypted event messages. In some instances the generic takeover panel 810 may generate an error or warning as a result of unrecognized packets from the anti-takeover peripheral device 715, such as a pin packet, serial number packet, and the like.

Figure 10:
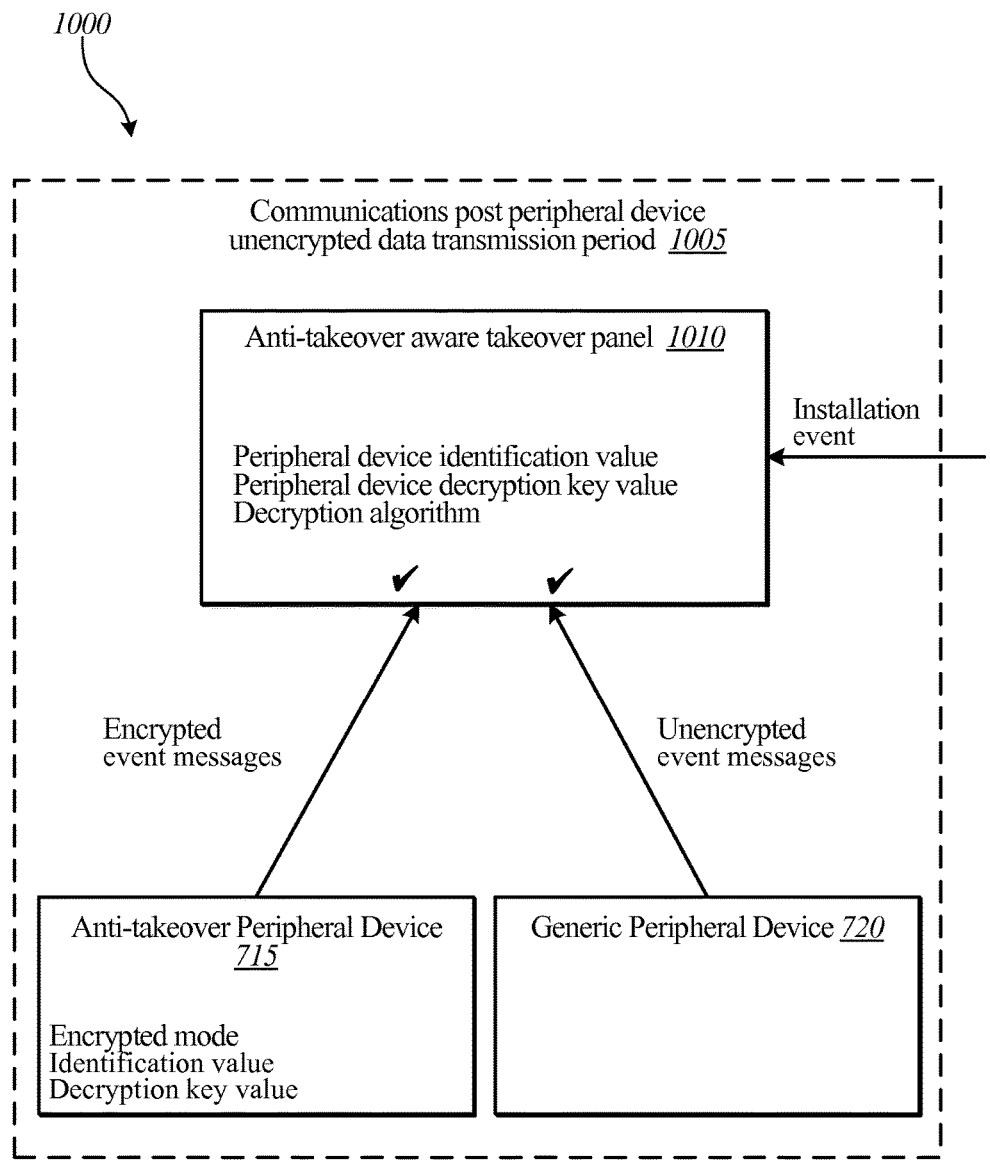
FIG. 10 is a block diagram of an anti-takeover peripheral device of FIG. 4 and a generic peripheral device in communication with an anti-takeover controller device of FIG. 5 after expiration of the peripheral device unencrypted data transmission period.

Referring now to an environment 1000 shown in FIG. 10, an anti-takeover aware takeover panel 1010 may be installed and/or involve communications during the peripheral device unencrypted data transmission period 1005. The anti-takeover aware takeover panel 1010 may operate normally during this period, properly processing unencrypted event messages from both generic peripheral devices 720 and from the anti-takeover peripheral device 715 as indicated by the two check marks. During the remainder of the decryption key transition period, when the anti-takeover aware takeover panel 1010 receives the key serial number and the decryption key value from the anti-takeover peripheral device 715, the anti-takeover aware takeover panel 1010 stores the number and the value in the panel cache, as well as transmits the number and value for storage in a remote data store.

Figure 11:
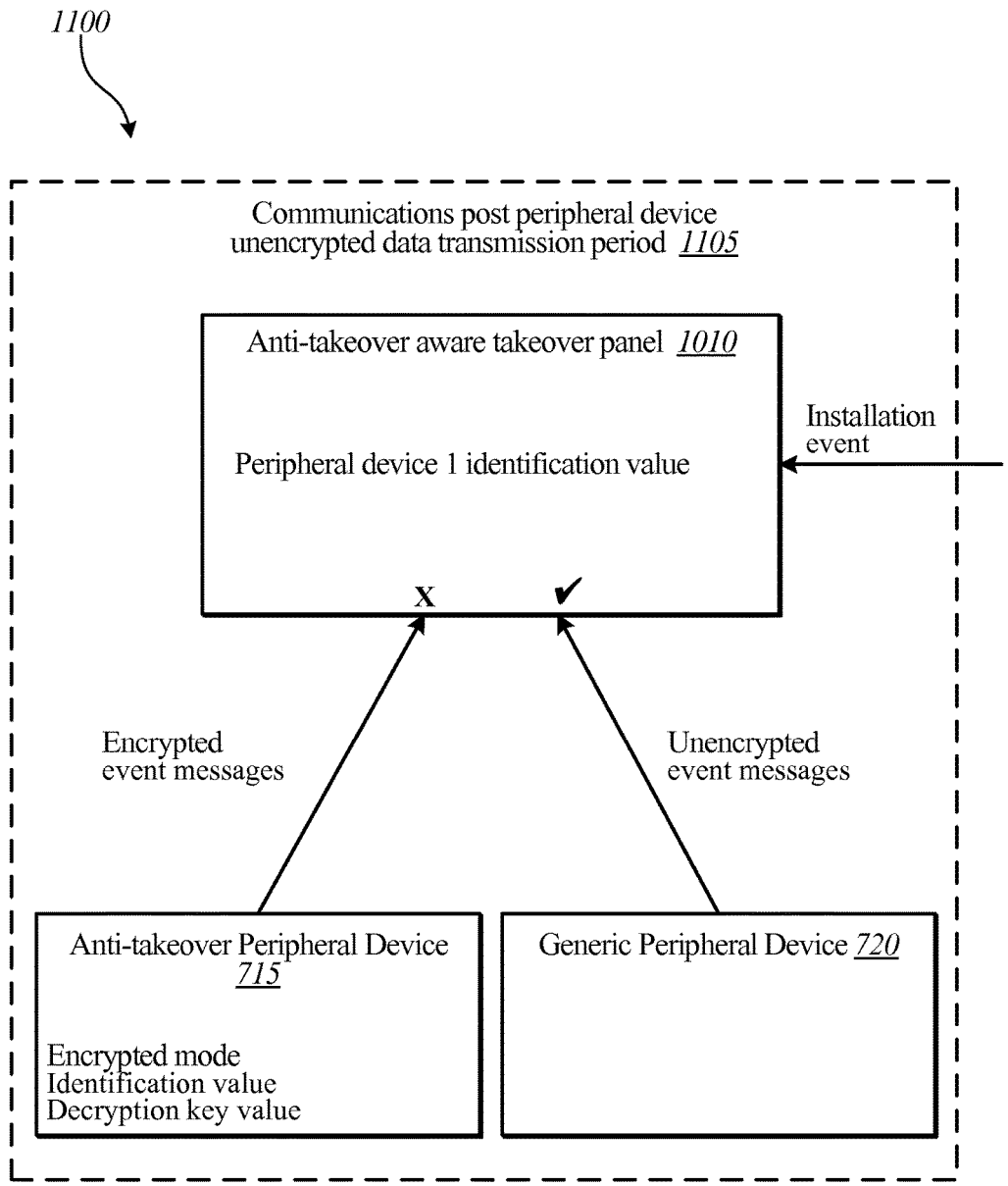
FIG. 11 is a block diagram of an anti-takeover peripheral device of FIG. 4 and a generic peripheral device in communication with an anti-takeover controller device of FIG. 5 installed after expiration of the peripheral device unencrypted data transmission period.

Referring now to an environment 1100 shown in FIG. 11, the anti-takeover aware takeover panel 1010 installed and/or involve communications during the peripheral device unencrypted data transmission period 1105 may continue to operate properly with respect to the anti-takeover peripheral device 715 transmission once the peripheral device unencrypted data transmission period expires. At the time of this expiration, the anti-takeover peripheral device 715 will cease transmitting the decryption key value and the key serial number, and will begin encrypting all event message transmissions. As the anti-takeover aware takeover panel 1010 has both the decryption algorithm and the decryption key value to input into the decryption algorithm, the anti-takeover aware takeover panel 1010 will be able to decrypt messages received from the anti-takeover peripheral device 715. The anti-takeover aware takeover panel 1010 may also operate normally with respect to generic peripheral devices 720 that continue to transmit unencrypted event messages. In some instances the anti-takeover aware takeover panel 1010 may retrieve the key serial number, the decryption key value, or both (e.g., from the remote database 165 shown in FIG. 1).

Figure 12:
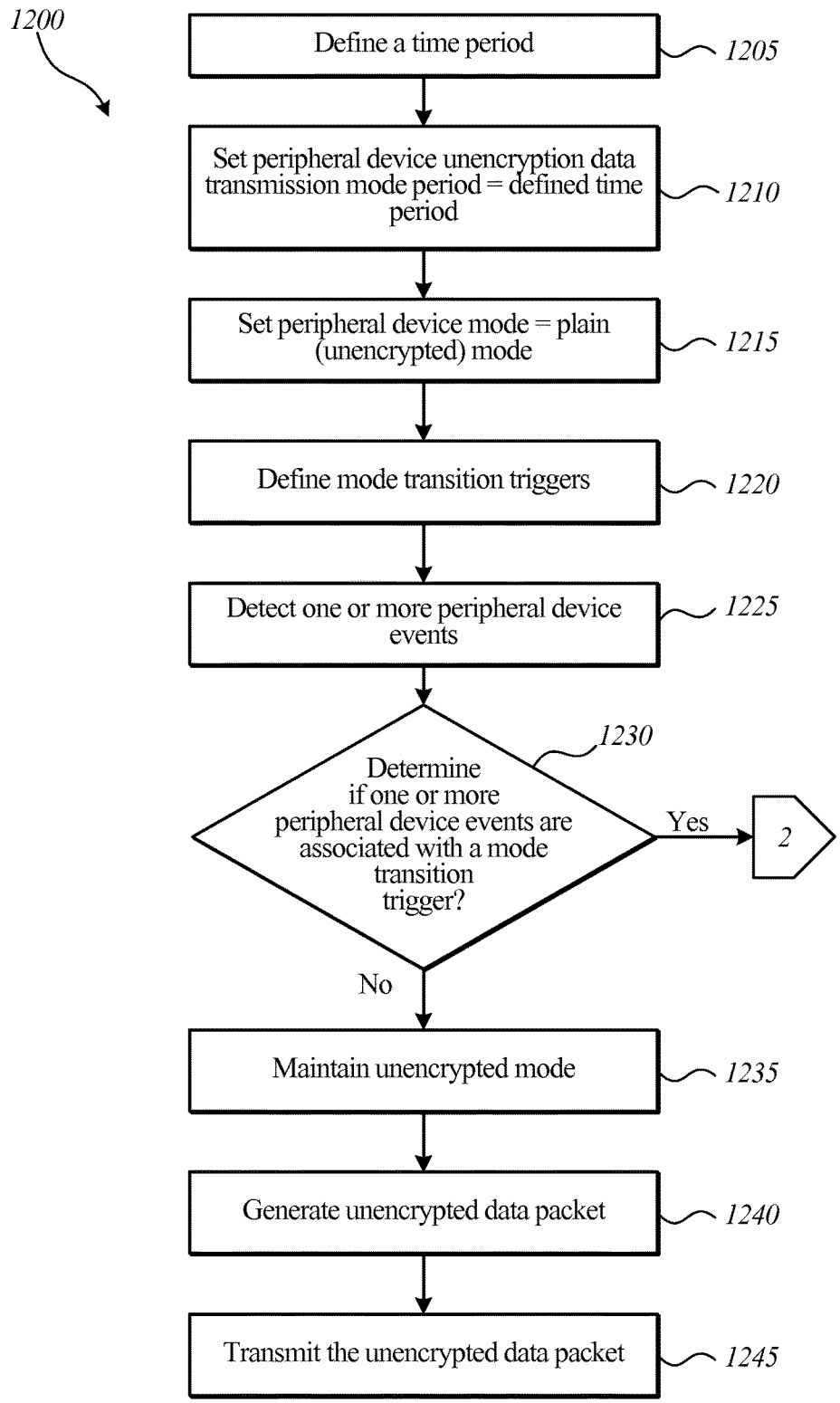
FIG. 12 and FIG. 13 are flow diagrams illustrating an exemplary method for the encryption and transmission of data packets by the anti-takeover peripheral device of FIG. 4 based on transmission modes.
Figure 13:
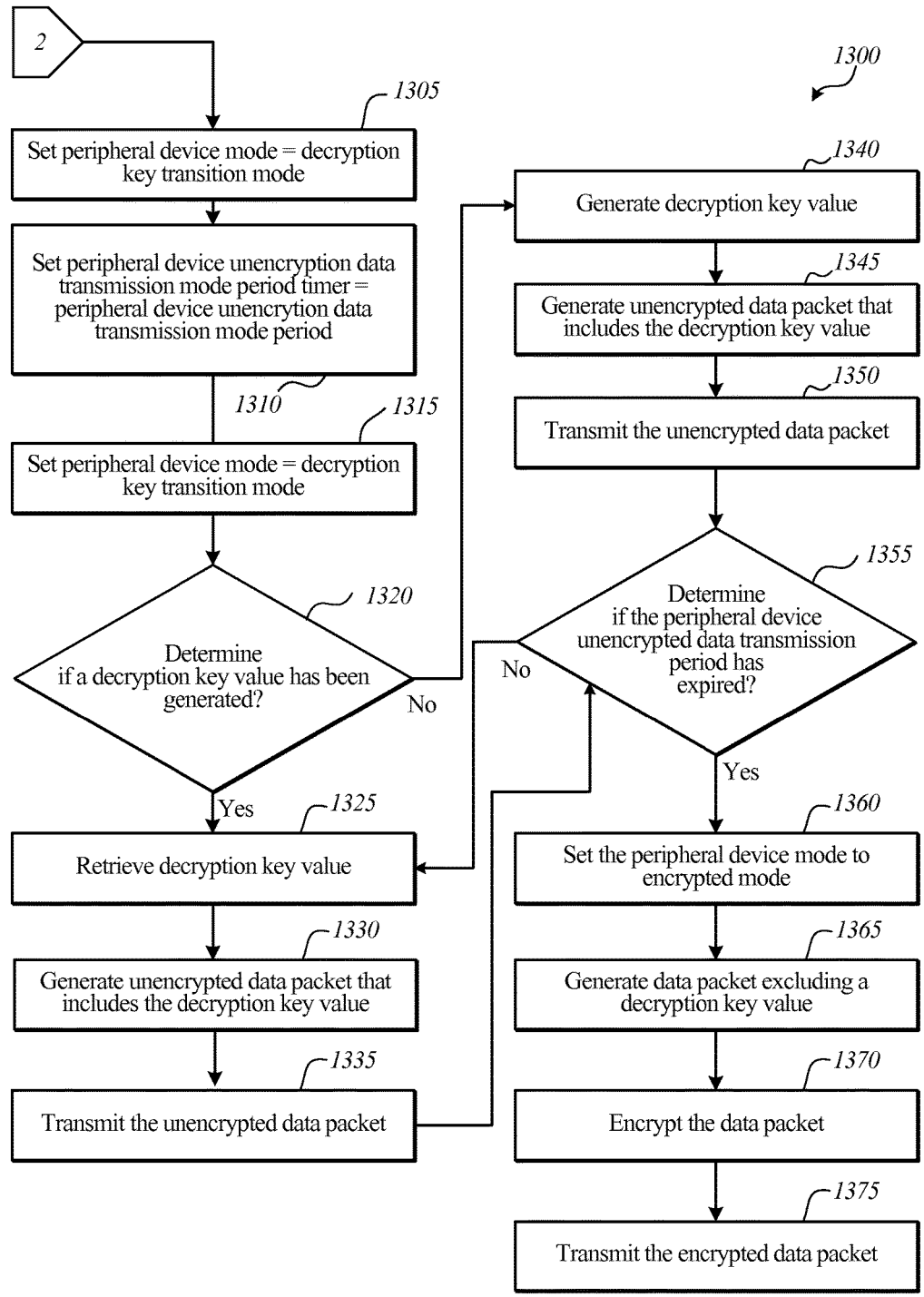

Referring now to FIG. 12 and FIG. 13, a general anti-takeover peripheral device method 1200 using various embodiments of the systems and/or devices described herein is shown. For example, method 1200 may be implemented utilizing the various embodiments of environment 100, peripheral devices 130 including feature controller 135, sensor 140, router 145, and meter 150, the various anti-takeover peripheral device modules 405, 410, 420, 425, 430, 435, 205-a, 210-a, 215-a of FIG. 4, the modules included in the peripheral anti-takeover module 605, 610, 615, 620, 625, 630 of FIG. 6, and/or other devices and/or components.

Referring to FIG. 12, at block 1205, a time period is defined that can be used, at least as a default value, for the length of time in which the anti-takeover device (e.g., feature controller 135; see FIG. 1) will operate in decryption key transmission mode. At block 1210, the mode management module 620 sets the peripheral device unencrypted data transmission mode period equal to the period of time defined at block 1205. In certain instances, this period value is set during manufacturing. In addition, or alternatively, this period value may be set, modified, or both by the mode management module 620 (e.g., see FIG. 6) or by some other post-manufacturing process. At block 1215, the peripheral device mode is set to plain mode, resulting in the device initially transmitting unencrypted event messages. At block 1220, one or more mode transition triggers are defined. These triggers can include, for example, the detection of specific event messaging content, timing, order, or pattern. In addition, or alternatively, these triggers can include detection of specific transition commands, detection of direct manipulation of peripheral device hardware, or both.

At block 1225, the event detection engine 630 (e.g., see FIG. 6) detects one or more peripheral device events. These events can include, for example, external events monitored or controlled by the peripheral device, such as open/close door events in the case of a door sensor, or connection events where ground and reset test points of one or more programming test pins are connected by a wire or configuration tool and maintained for a defined period of time. Event information is forwarded by the event detection engine 630 to the mode management module 620 that determines if one or more of the peripheral device events are associated with one or more of the pre-defined mode transition trigger definitions at block 1230.

If no match is detected, at block 1235, the mode management module 630 does not initiate a mode transition, instead maintaining plain mode. At block 1240 and 1245, the packet generation module 625 generates one or more data packets, and the communication module 420 (e.g., see FIG. 4) directs the transmitter module 215 (e.g., see FIG. 2) to transmit the one or more data packets in an unencrypted message. The event detection engine 630 and mode management module 620 continue to monitor for mode transition triggering events.

If one or more of the received event messages detected by the event detection engine 630 matches a pre-defined mode transition trigger definition, the mode management module 620 may transition the operational mode of the peripheral device in accordance with the pre-defined mode transition trigger definitions. Referring now to FIG. 13, in some embodiments, a pre-defined mode transition trigger definition includes a trigger that transitions the peripheral device mode from the plain mode to the decryption key transmission mode (block 1305). At or near the time this transition occurs, a peripheral device unencrypted data transmission mode period timer is set to the peripheral device unencrypted data transmission mode period (block 1310), and at block 1315, the transmission mode period timer mechanism is initiated. In some embodiments, the timer includes a timer mechanism that is decremented at fixed intervals, such as days, is monitored by the mode management module 620, serves to drive a notification function of the event mode period timer module 615, or the like. In other instances, the timer mechanism is a value, such as a date, that serves to define an expiration point in time, and which other modules, such as the mode management module 620, use to determine if the transmission mode period has expired.

At block 1320, the decryption key value generation module determines if a decryption key value exists. If a value does exist, at block 1325, the decryption key value is retrieved, at block 1330, unencrypted data packet that includes the decryption key value is generated, and at block 1335, the unencrypted data packet is transmitted. This value may be retrieved from the cache or from a persistent data store on the peripheral device 130. If the value does not exist, at block 1340, the decryption key value generation module 605 (e.g., see FIG. 6) will generate a decryption key value as described previously, generate unencrypted data packet that include the decryption key value at block 1345, and transmit the unencrypted data packet at block 1350.

At block 1355, the mode management module 620 determines if the peripheral device unencrypted data transmission period has expired based on one or more of the monitoring mechanisms described previously. If it is determined that the peripheral device unencrypted data transmission period has not expired, the packet generation module 625 will generate unencrypted data packets at block 1330, one or more of which include the decryption key value. At block 1335, the communication module 420 (e.g., see FIG. 4) directs the transmitter module 215 (e.g., see FIG. 2) to transmit the one or more unencrypted messages. In some embodiments, the event detection engine 630 and mode management module 620 continue to monitor for mode transition triggering events (block 1220, 1225).

If, on the other hand, it is determined that the peripheral device unencrypted data transmission period has expired, at block 1360, the mode management module 620 (e.g., see FIG. 6), transitions the peripheral device mode to secure mode. At block 1365, the packet generation module 625 generates unencrypted data packets, none of which include the decryption key value. At block 1370, the packet generation module 625 forwards one or more packets to the message encryption module 610. The message encryption module 610 will use the decryption key value to encrypt one or more messages that include one or more of the received packets. At block 1375, the message encryption module 610 forwards one or more of the encrypted messages to the communication module 420 (e.g., see FIG. 4) which directs the transmitter module 215 (e.g., see FIG. 2) to transmit the one or more encrypted messages. In some embodiments, the event detection engine 630 and mode management module 620 no longer monitor for mode transition triggering events, the peripheral device remains in secure mode, and event messages are encrypted and transmitted when detected.

Figure 14:
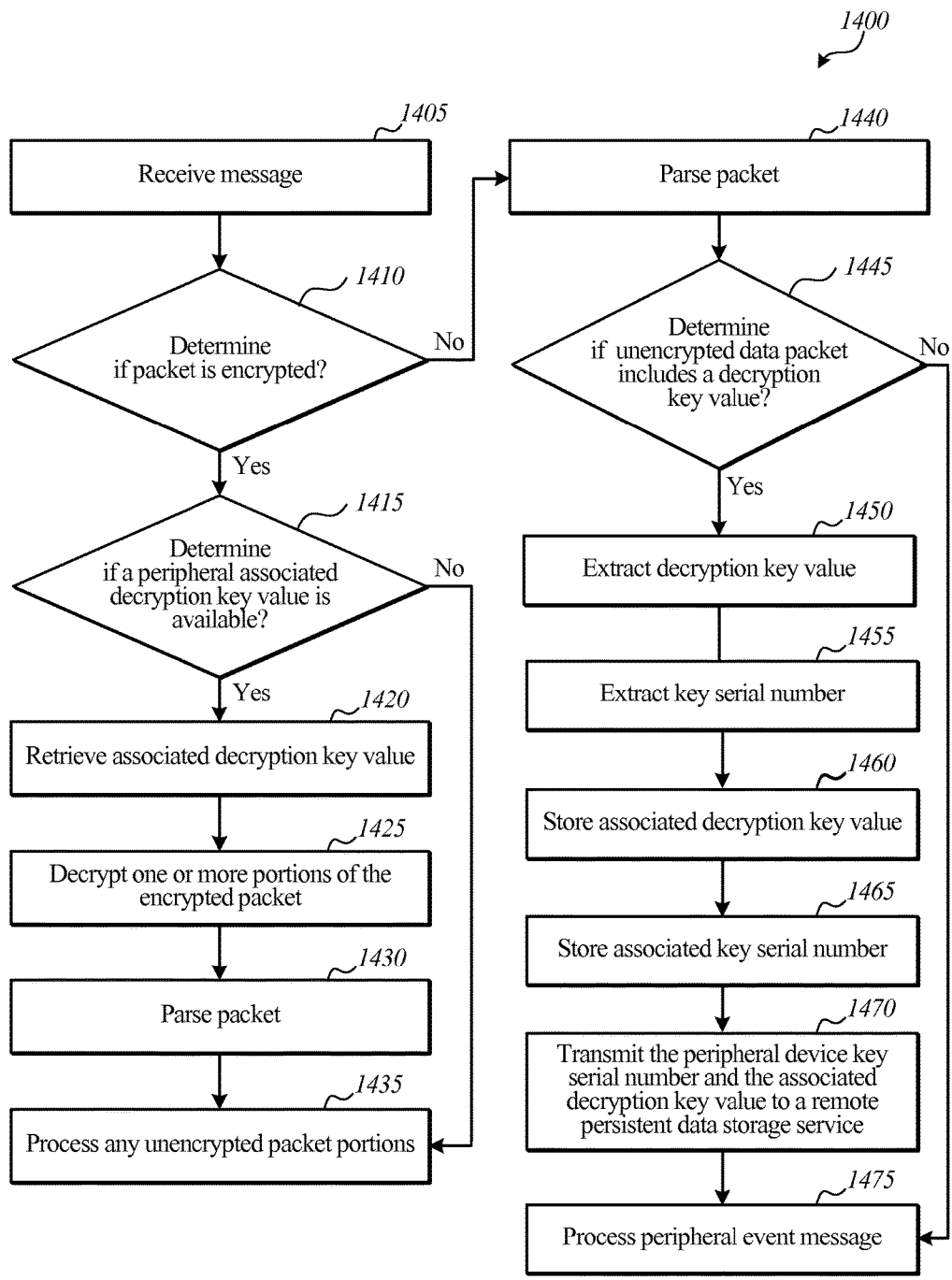
FIG. 14 is a flow diagrams illustrating an exemplary method for receiving, decrypting, and processing encrypted data packets by the anti-takeover controller device of FIG. 5.

Referring now to FIG. 14, a general anti-takeover controller device method 1400 using various embodiments of the systems and/or devices described herein is shown. For example, method 1400 may be implemented utilizing the various embodiments of environment 100, controller devices 105 including portable controller 110, panel controller 115, and central controller 120, the various anti-takeover controller device modules 505, 510, 520, 525, 530, 535, 305-a, 310-a, 315-a of FIG. 5, the modules included in the event processing module 640, 645, 650 of FIG. 6, and/or other devices and/or components.

Still referring to FIG. 14, at block 1405, the controller device 105 (e.g., see FIG. 1) receives a message. In certain instances, the message will be a peripheral device message that includes one or more packets of the packet types described previously. At block 1410, the event processing module 530 (e.g., see FIG. 5) determines if the message is encrypted or unencrypted. At block 1440, if the message is unencrypted, the packet parsing module 645 parses one or more packets included in the unencrypted message. At block 1445, the decryption key value storage and retrieval module 650 determines if the one or more of the parsed packets includes a decryption key value element. If the decryption key value is not included, the message is processed based, at least in part, on the contents and type of packets contained in the message at block 1475.

If the decryption key value storage and retrieval module 650 determines if the one or more of the parsed packets includes a decryption key value element, the decryption key value and key serial number are extracted from relative packets and stored locally in cache memory, persistent memory, or both at blocks 1450, 1455, 1460, 1465. At block 1470, the data module 525 directs the communication module 535 to transmit the peripheral key serial number and the decryption key value to a service provider device 160 for storage in a remote database 165. The message is then processed based, at least in part, on the contents and type of packets contained in the message at block 1475.

If at block 1410, the event processing module 530 (e.g., see FIG. 5) determines the message is encrypted, and determines at block 1415 that a decryption key value is available, the decryption key value storage and retrieval module 650 (e.g., see FIG. 6) retrieves the associated decryption key value at block 1420 and forwards the decryption key value to the message decryption module 640. At block 1425, the message decryption module 640 uses the decryption key value as an input to the encryption key to decrypt one or more portions of the encrypted message. At block 1430, the packet parsing module 645 parses one or more packets included in the decrypted message. The one or more decrypted messages are then processed based, at least in part, on the contents and type of packets contained in the message at block 1435.

Figure 15:
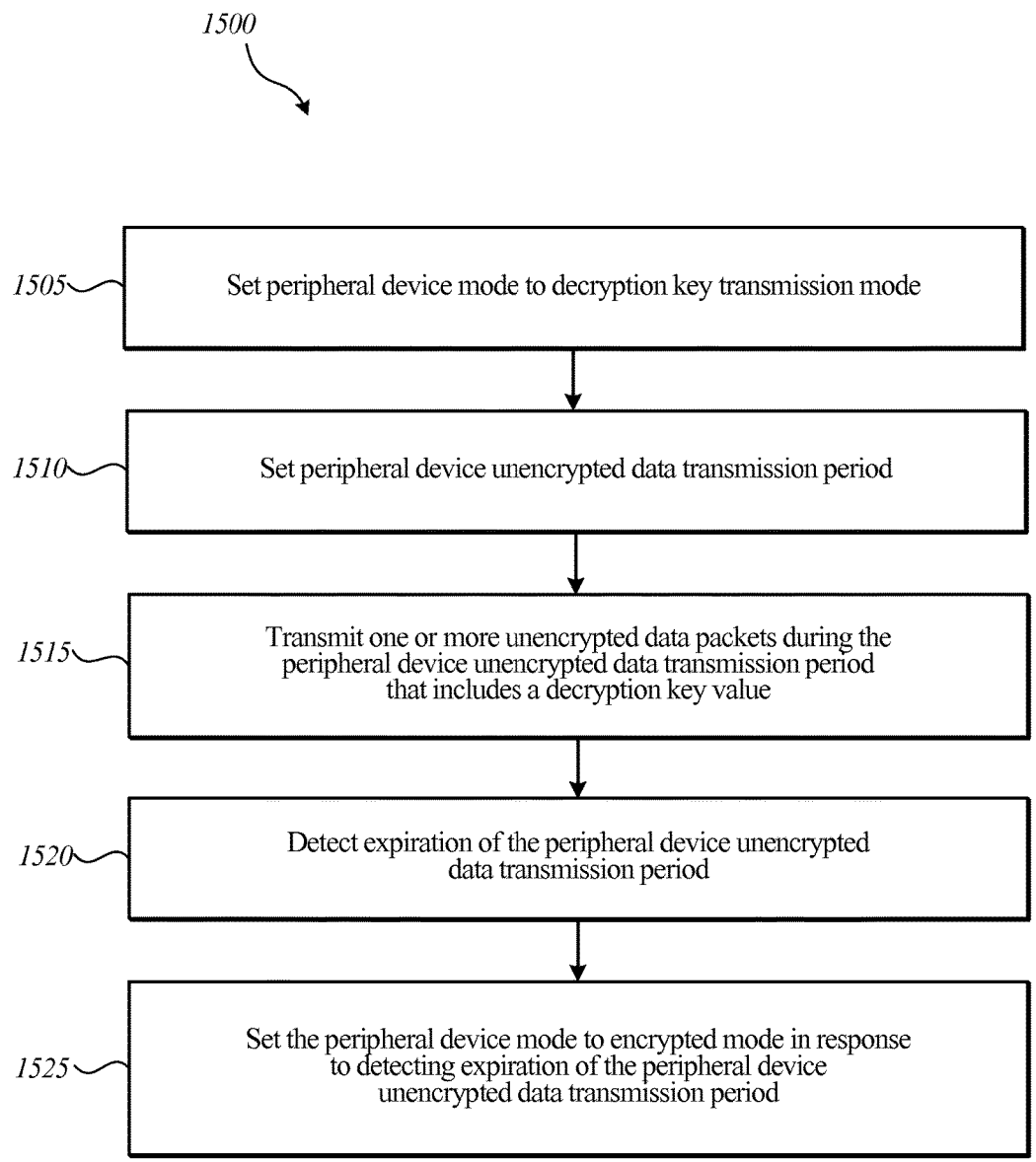
FIG. 15 is a flow diagram illustrating an exemplary method for the anti-takeover peripheral device of FIG. 4 to operate in decryption key transmission mode.
Figure 16:
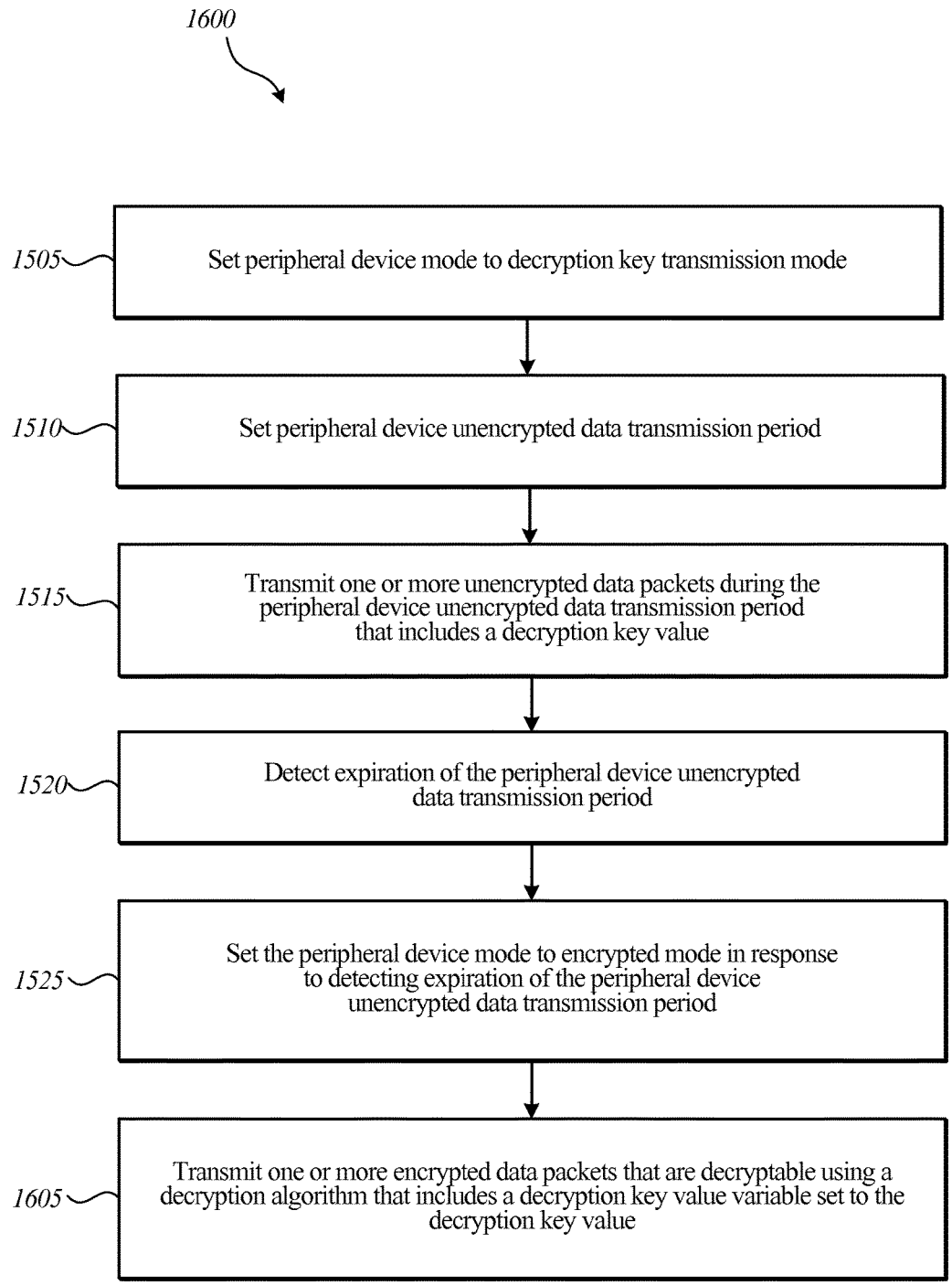
FIG. 16 is a flow diagram illustrating an exemplary method for the anti-takeover peripheral device of FIG. 4 to transition from operating in decryption key transmission mode to operating in encrypted mode.

Referring now to FIG. 15 and FIG. 16, flowcharts illustrating methods 1500 and 1600 for implementing a peripheral anti-takeover mechanism are shown in accordance with various embodiments of the systems and/or devices described herein is shown. For example, method 1500 and 1600 may be implemented utilizing the various embodiments of environment 100, peripheral devices 130 including feature controller 135, sensor 140, router 145, and meter 150, the various anti-takeover peripheral device modules 405, 410, 420, 425, 430, 435, 205-a, 210-a, 215-a of FIG. 4, the modules included in the peripheral anti-takeover module 605, 610, 615, 620, 625, 630 of FIG. 6, and/or other devices and/or components.

At block 1505, the mode management module 620 may set the peripheral device mode to the decryption key transmission mode in accordance with one or more pre-defined mode transition trigger definitions. At or near the time this transition occurs, a peripheral device unencrypted data transmission mode period timer is set to the peripheral device unencrypted data transmission mode period (block 1510). In some embodiments, the timer includes a timer mechanism that is decremented at fixed intervals, such as days, is monitored by the mode management module 620, serves to drive a notification function of the event mode period timer module 615, or the like. In other instances, the timer mechanism is a value, such as a date, that serves to define an expiration point in time, and which other modules, such as the mode management module 620, use to determine if the transmission mode period has expired.

The packet generation module 625 will generate unencrypted data packets during the peripheral device unencrypted data transmission period, one or more of which include the decryption key value. At block 1515, during the peripheral device unencrypted data transmission period, the communication module 420 (e.g., see FIG. 4) directs the transmitter module 215 (e.g., see FIG. 2) to transmit one or more data packets in an unencrypted message.

At block 1520, the mode management module 620 (e.g., see FIG. 6) detects expiration of the peripheral device unencrypted data transmission period. In some embodiments, the mode management module 620 may, at certain intervals or upon the occurrence of certain events, monitor the transmission mode period timer. Alternatively, or in addition, the transmission mode period timer module 615 may notify the mode management module 620 of transmission mode period timer expiration. At block 1525, the mode management module 620 sets the peripheral device mode to secure mode in response to detecting expiration of the peripheral device unencrypted data transmission period.

At block 1605, the communication module 420 (e.g., see FIG. 4), directs the transmitter module 215 (e.g., see FIG. 2) to transmit one or more data packets in an encrypted message received from the message encryption module 610 and decryptable using a decryption algorithm where a variable input to the algorithm is set to the decryption key value for the peripheral device for the additional step included in method 1600.

Figure 17:
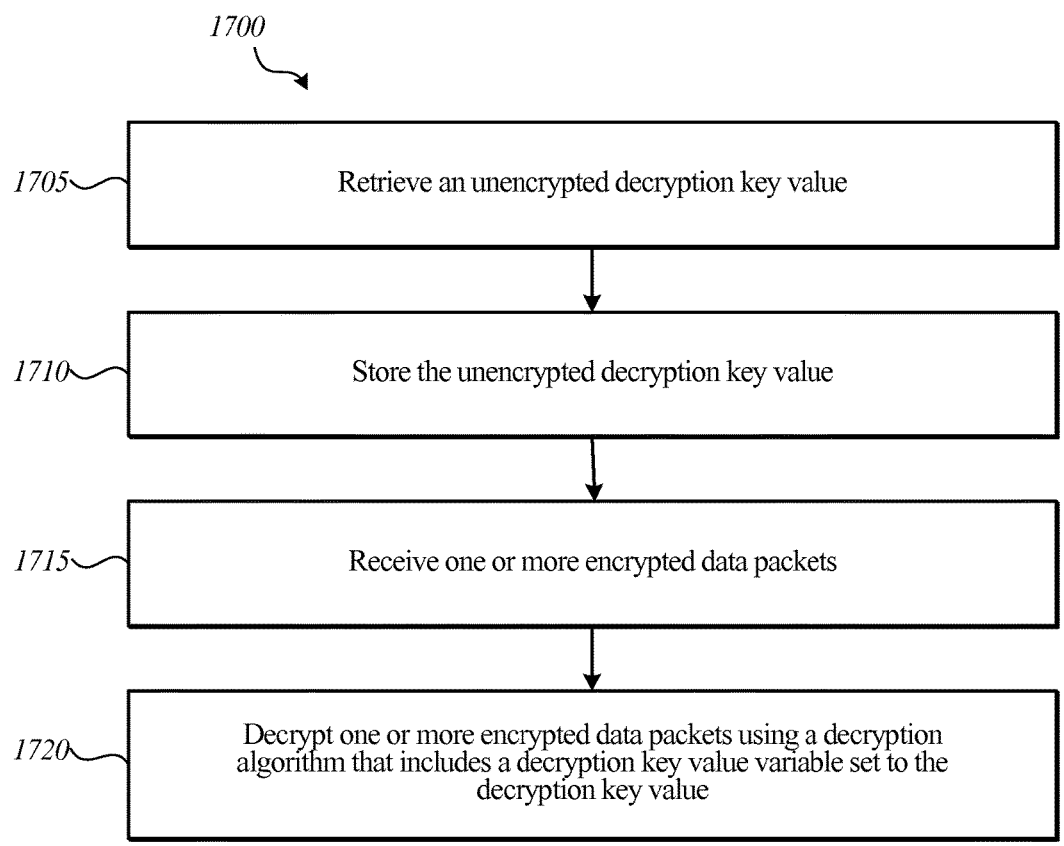
FIG. 17 is a flow diagram illustrating an exemplary method for the anti-takeover controller device of FIG. 5 to operate in decryption key transmission mode.
Figure 18:
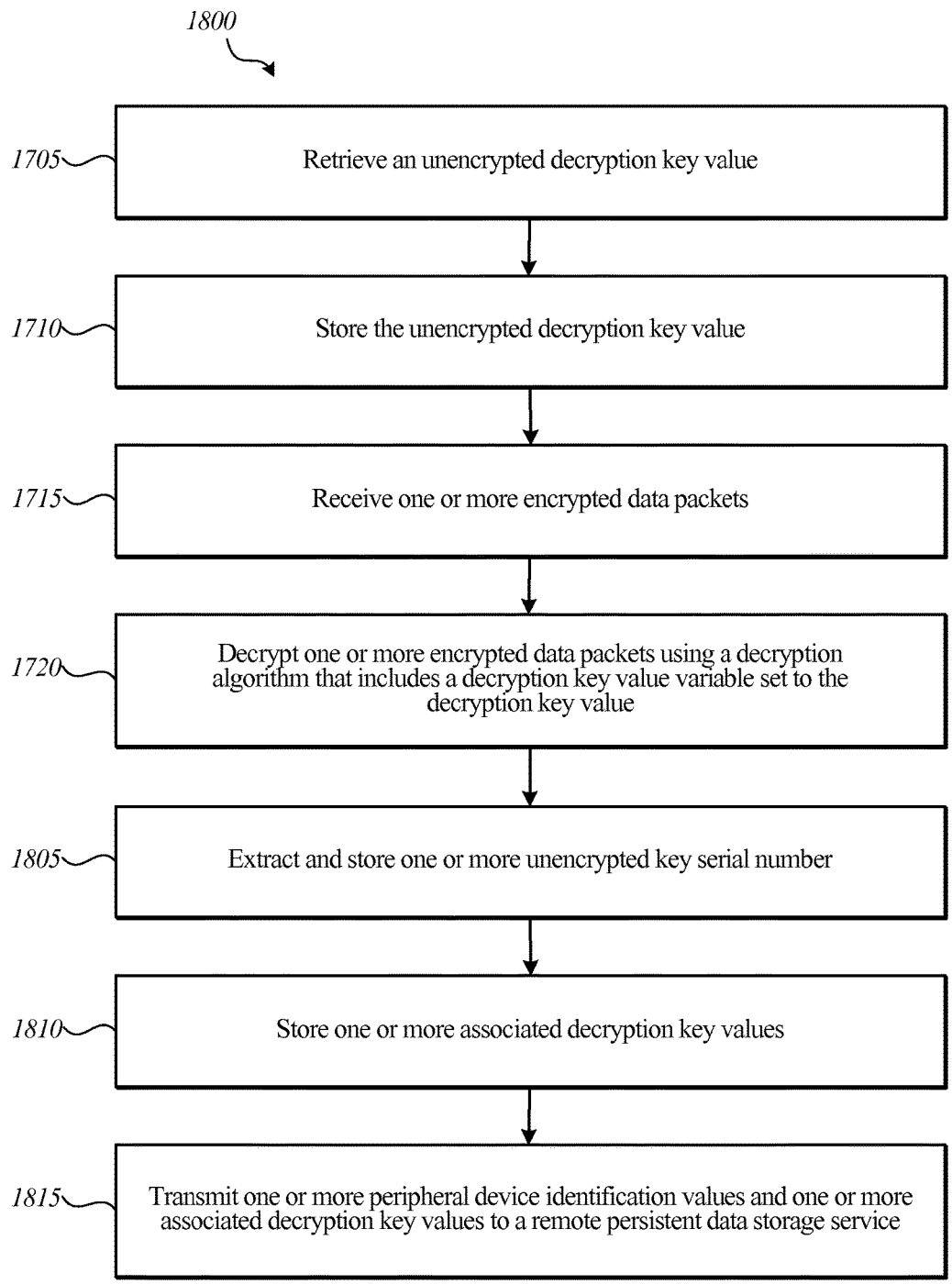
FIG. 18 is a flow diagram illustrating an exemplary method for the anti-takeover controller device of FIG. 5 to store device identification values and one or more associated decryption key values at a remote data storage service.

Referring now to FIG. 17 and FIG. 18, flowcharts illustrating methods 1500 and 1600 for implementing a controller device anti-takeover mechanism are shown in accordance with various embodiments of the systems and/or devices described herein is shown. For example, method 1400 may be implemented utilizing the various embodiments of environment 100, controller devices 105 including portable controller 110, panel controller 115, and central controller 120, the various anti-takeover controller device modules 505, 510, 520, 525, 530, 535, 305-a, 310-a, 315-a of FIG. 5, the modules included in the event processing module 640, 645, 650 of FIG. 6, and/or other devices and/or components.

At block 1705, the decryption key value storage and retrieval module 650 (e.g., see FIG. 6) receives one or more of the parsed packets that include an unencrypted decryption key value. At block 1710, the unencrypted decryption key value is extracted from packet and stored locally in cache memory, persistent memory, or both. At block 1715, the event processing module 530 (e.g., see FIG. 5) receives one or more encrypted data packets. At block 1720, the message decryption module decrypts one or more of the received encrypted messages using a decryption algorithm where a variable input to the algorithm is set to the decryption key value for the peripheral device.

In some embodiments (e.g., method 1800 shown in FIG. 18), at block 1805, the unencrypted key serial number is extracted from a data packet and stored locally in cache memory, persistent memory, or both. At block 1810, one or more associated decryption key values is stored. At block 1815, the data module 525 (e.g., see FIG. 5) directs the communication module 535 to transmit the peripheral key serial number and the decryption key value to a service provider device 160 (e.g., see FIG. 1) for storage in a remote database 165.

Figure 19:
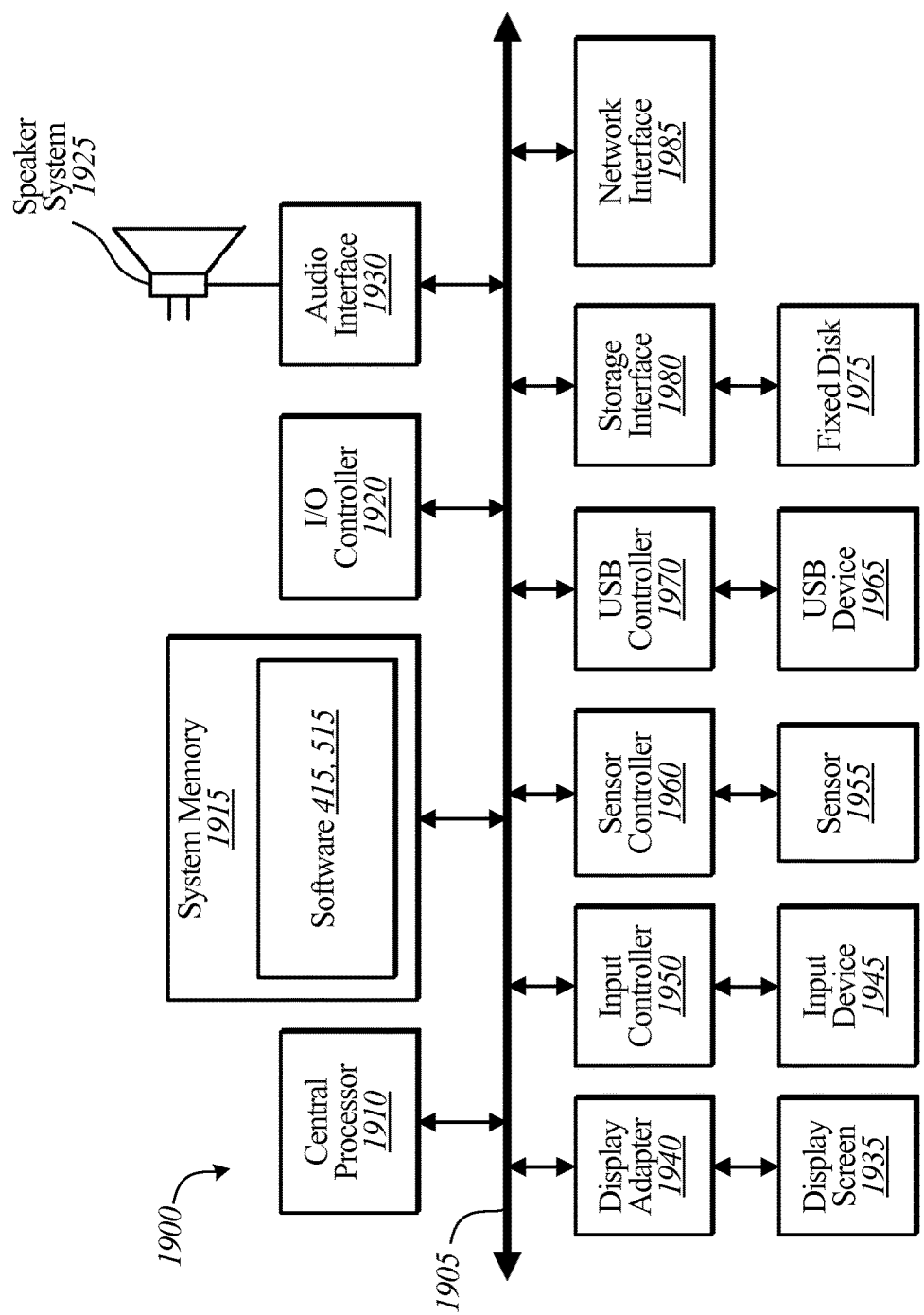
FIG. 19 is a block diagram of a computer system suitable for implementing the present systems and methods of FIG. 1.

Referring now to FIG. 19, the controller 1900 may be an example of a controller device 105 (e.g., see FIG. 1). In one configuration, controller 1900 includes a bus 1905 which interconnects major subsystems of controller 1900, such as a central processor 1915, a system memory 1920 (typically RAM, but which may also include ROM, flash RAM, or the like), an input/output controller 1925, an external audio device, such as a speaker system 1930 via an audio output interface 1935, an external device, such as a display screen 1935 via display adapter 1940, an input device 1945 (e.g., remote control device interfaced with an input controller 1950), multiple USB devices 1965 (interfaced with a USB controller 1970), and a storage interface 1980. Also included are at least one peripheral interface 1960 and a network interface 1985 (coupled directly to bus 1905).

Bus 1905 allows data communication between central processor 1915 and system memory 1920, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. Applications resident with controller 1900 are generally stored on and accessed via a non-transitory computer readable medium, such as a hard disk drive (e.g., fixed disk 1975) or other storage medium. Additionally, applications may be in the form of electronic signals modulated in accordance with the application and data communication technology when accessed via network interface 1985.

Storage interface 1980, as with the other storage interfaces of controller 1900, may connect to a standard computer readable medium for storage and/or retrieval of information, such as a fixed disk drive 1975. Fixed disk drive 1975 may be a part of controller 1900 or may be separate and accessed through other interface systems. Network interface 1985 may provide a direct connection to a remote server via a direct network link to the Internet. Network interface 1985 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1900 wirelessly via network interface 1985, peripheral interface 1960, or both.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 19 need not be present to practice the present systems and methods. The devices and subsystems may be interconnected in different ways from that shown in FIG. 19. The aspect of some operations of a system such as that shown in FIG. 19 are readily known in the art and are not discussed in detail in this application. Computer instructions to implement the present disclosure may be stored in a non-transitory computer-readable medium such as one or more of system memory 1920 or fixed disk 1975. The operating system provided on controller 1900 may be, for example, iOS®, ANDROID®, MS-DOS®, MS-WINDOWS®, OS/2®, UNIX®, LINUX®, OSX®, or another known operating system.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above-described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures may be implemented to achieve the same functionality.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An automated networked peripheral anti-takeover method for a peripheral device, comprising:
    receiving a message;
    identifying that the message comprises a transition trigger based at least in part on a timing and a pattern of the received message;
    setting a peripheral device mode to decryption key transmission mode based at least in part on the message comprising the transition trigger;
    setting a peripheral device unencrypted data transmission period;
    monitoring a number of occurrences of peripheral device events, wherein the peripheral device events are based at least in part on a sensor condition detected at the peripheral device;
    generating an encryption key comprising a decryption key value and a key serial number associated with the number of occurrences of peripheral device events;
    modifying the key serial number based at least in part on a type of peripheral device event and a number of occurrences of the type of peripheral device event detected at the peripheral device during the monitoring;
    transmitting, from a peripheral device, one or more unencrypted data packets comprising the encryption key during the peripheral device unencrypted data transmission period;
    detecting, at the peripheral device, an expiration of the peripheral device unencrypted data transmission period; and
    setting the peripheral device mode to an encrypted mode in response to detecting the termination of the peripheral device unencrypted data transmission period.

2. The method of claim 1, further comprising:
    transmitting one or more encrypted data packets, wherein the one or more encrypted data packets are decryptable using a decryption algorithm comprising a decryption key value variable, wherein the decryption key value variable is set to the decryption key value.

3. The method of claim 1, wherein the termination of the peripheral device unencrypted data transmission period comprises the expiration of a pre-defined period of time.

4. The method of claim 3, wherein the pre-defined period of time is defined prior to an installation event.

5. The method of claim 1, wherein setting of a peripheral device mode to decryption key transmission mode comprises detecting a pre-defined sensor event pattern.

6. The method of claim 1, wherein setting of a peripheral device mode to decryption key transmission mode comprises connecting a ground pin point and a reset pin point for a pre-defined duration.

7. The method of claim 1, wherein setting the peripheral device mode to encrypted mode comprises a permanent setting.

8. The method of claim 1, wherein setting the peripheral device mode to decryption key transmission mode occurs prior to deployment of the peripheral device.

9. A networked peripheral anti-takeover system for a peripheral device, the system comprising:
    a processor;
    a memory; and
    instructions stored in the memory, the instructions being executable by the processor to:
        receive a message;
        identify that the message comprises a transition trigger based at least in part on a timing and a pattern of the received message;
        set a peripheral device mode to decryption key transmission mode based at least in part on the message comprising the transition trigger;
        set a peripheral device unencrypted data transmission period;
        monitor a number of occurrences of peripheral device events, wherein the peripheral device events are based at least in part on a sensor condition detected at the peripheral device;
        generate an encryption key comprising a decryption key value and a key serial number associated with the number of occurrences of peripheral device events;
        modify the key serial number based at least in part on a type of peripheral device event and a number of occurrences of the type of peripheral device event detected at the peripheral device during the monitoring;

transmit one or more unencrypted data packets comprising the encryption key during the peripheral device unencrypted data transmission period;

detect termination of the peripheral device unencrypted data transmission period; and set the peripheral device mode to encrypted mode in response to termination of the peripheral device unencrypted data transmission period.

10. The device of claim 9, wherein the instructions are further executable by the processor to:

transmit one or more encrypted data packets, wherein the one or more encrypted data packets are decryptable by a decryption algorithm comprising a decryption key value variable, wherein the decryption key value variable is set to the decryption key value.

11. The device of claim 9, wherein the termination of the peripheral device unencrypted data transmission period comprises the expiration of a pre-defined period of time.

12. The device of claim 11, wherein the pre-defined period of time is defined prior to an installation event.

13. The device of claim 9, wherein for setting a peripheral device mode to key transmission mode, the processor is further configured to detect a pre-defined sensor event pattern.

14. The device of claim 9, wherein setting of a peripheral device mode to key transmission mode comprises connecting a ground pin point and a reset pin point for a pre-defined duration.

15. A controller anti-takeover computer program product, comprising:

a non-transitory computer-readable medium comprising:

code for receiving a message;

code for identifying that the message comprises a transition trigger based at least in part on a timing and a pattern of the received message;

code for setting a peripheral device mode for a peripheral device to decryption key transmission mode based at least in part on the message comprising the transition trigger;

code for setting a peripheral device unencrypted data transmission period;

code for monitoring a number of occurrences of peripheral device events, wherein the peripheral device events are based at least in part on a sensor condition detected at the peripheral device;

code for generating an encryption key comprising a decryption key value and a key serial number associated with the number of occurrences of peripheral device events;

code for modifying the key serial number based at least in part on a type of peripheral device event and a number of occurrences of the type of peripheral device event detected at the peripheral device during the monitoring;

code for transmitting at a peripheral device one or more unencrypted data packets comprising the encryption key during the peripheral device unencrypted data transmission period;

code for detecting termination of the peripheral device unencrypted data transmission period; and code for setting the peripheral device mode to encrypted mode in response to detecting a termination of the peripheral device unencrypted data transmission period.

* * * * *